United States Patent
Lee et al.

(10) Patent No.: US 7,880,845 B2
(45) Date of Patent: Feb. 1, 2011

(54) LIQUID CRYSTAL DISPLAY WITH A CONTROL ELECTRODE PARTIALLY OVERLAPPING SLITS FORMING DOMAINS WITH A PIXEL ELECTRODE AND A PROTRUSION PATTERN PROVIDING HIGHER POSITION FOR THE CONTROL ELECTRODE THAN THE PIXEL ELECTRODE

(75) Inventors: Jun-Woo Lee, Anyang-si (KR);
Hee-Seop Kim, Hwaseong-si (KR);
LuJian Gang, Suwon-si (KR);
Seung-Hoon Lee, Yongin-si (KR);
Hwa-Sung Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 12/045,292

(22) Filed: Mar. 10, 2008

(65) Prior Publication Data
US 2008/0278651 A1 Nov. 13, 2008

(30) Foreign Application Priority Data
May 8, 2007 (KR) .................. 10-2007-0044630

(51) Int. Cl.
*G02F 1/1337* (2006.01)
(52) U.S. Cl. .................. 349/129; 349/130; 349/143; 349/144; 349/146
(58) Field of Classification Search .................. 349/143, 349/144, 146, 129, 130
See application file for complete search history.

(56) References Cited

U.S. PATENT DOCUMENTS

| 6,081,315 | A | * | 6/2000 | Matsuyama et al. | .......... 349/143 |
| 6,462,798 | B1 | * | 10/2002 | Kim et al. | .................. 349/129 |

FOREIGN PATENT DOCUMENTS

| JP | 11109393 | 4/1999 |
| JP | 2000193979 | 7/2000 |
| JP | 2001042347 | 2/2001 |

\* cited by examiner

*Primary Examiner*—John Heyman
(74) *Attorney, Agent, or Firm*—H.C. Park & Associates, PLC

(57) ABSTRACT

Provided are a liquid crystal display (LCD) and a method of fabricating the LCD. The LCD includes an insulating substrate a gate line disposed on the insulating substrate, a data line insulated from the gate line and crossing the gate line, a thin film transistor connected to the gate line and the data line, a passivation layer disposed on the thin film transistor, a pixel electrode connected to the thin film transistor and partitioned into a plurality of domains by a plurality of first slits, a control electrode disposed on the passivation layer and at least partially overlapping each first slit, and a plurality of domain forming members arranged parallel to the first slits in an alternating fashion and partitioning the pixel electrode into a plurality of domains.

16 Claims, 15 Drawing Sheets

LIQUID CRYSTAL DISPLAY WITH A CONTROL ELECTRODE PARTIALLY OVERLAPPING SLITS FORMING DOMAINS WITH A PIXEL ELECTRODE AND A PROTRUSION PATTERN PROVIDING HIGHER POSITION FOR THE CONTROL ELECTRODE THAN THE PIXEL ELECTRODE

CROSS REFERENCE TO RELATED APPLICATION

This application claims priority from and the benefit of Korean Patent Application No. 10-2007-0044630, filed on May 8, 2007, which is hereby incorporated by reference for all purposes as if fully set forth herein.

BACKGROUND OF THE INVENTION

1. Field of the Invention

The present invention relates to a liquid crystal display (LCD) and a method of fabricating the same, and more particularly, to an LCD that may control texture by applying a low control voltage to a control electrode and a method of fabricating the LCD.

2. Discussion of the Background

Liquid crystal displays (LCDs) are one of the most widely used types of flat panel displays (FPDs). An LCD includes two substrates, on which electrodes are formed, and a liquid crystal layer interposed between the two substrates. The alignment of the liquid crystal molecules of the liquid crystal layer may be changed by applying voltages to the electrodes, thereby allowing the amount of light transmitted to be controlled. In this way, the LCD displays a desired image.

Recently, the contrast ratio has become a very important characteristic of an LCD. Accordingly, methods of enhancing this characteristic are actively being developed. In particular, patterned vertical alignment (PVA) mode LCDs are superior to in-plane switching (IPS) mode LCDs in terms of contrast ratio and processing stability. However, unlike an IPS mode LCD or a multi-domain vertical alignment (MVA) mode LCD, a PVA mode LCD controls texture by patterning common electrodes on a common electrode display panel, which is generally an upper panel. Therefore, the aperture ratio may be reduced if the common electrode display panel and a thin film transistor display panel are not aligned properly. In addition, the number of processes required to manufacture the LCD increases.

For this reason, studies are actively being conducted to find a way of controlling texture without patterning the common electrodes. In particular, a method of controlling texture using additional director control electrodes (DCEs) has been developed. However, this method requires a high control voltage to control texture since the DCEs are disposed under pixel electrodes, and the high control voltage causes leakage of light. Therefore, a structure, in which texture can be controlled while light leakage is prevented, is desirable.

SUMMARY OF THE INVENTION

The present invention provides a liquid crystal display (LCD) that may control texture by applying a low control voltage to a control electrode.

The present invention also provides a method of fabricating an LCD that may control texture by applying a low control voltage to a control electrode.

Additional features of the invention will be set forth in the description which follows, and in part will be apparent from the description, or may be learned by practice of the invention.

The present invention discloses an LCD including an insulating substrate, a gate line disposed on the insulating substrate, a data line insulated from the gate line and crossing the gate line, a thin film transistor connected to the gate line and the data line, a passivation layer disposed on the thin film transistor, a pixel electrode connected to the thin film transistor and partitioned into a plurality of domains by a plurality of first slits, a control electrode disposed on the passivation layer and at least partially overlapping each first slit, and a plurality of domain forming members arranged parallel to the first slits in an alternating fashion and partitioning the pixel electrode into a plurality of domains.

The present invention also discloses an LCD including an insulating substrate, a gate line disposed on the insulating substrate, a data line insulated from the gate line and crossing the gate line, a thin film transistor connected to the gate line and the data line, a pixel electrode connected to the thin film transistor, a control electrode positioned above the pixel electrode, and a protrusion pattern interposed between the control electrode and the pixel electrode. A control voltage higher than a data voltage is applied to the pixel electrode.

The present invention also discloses an LCD including an insulating substrate, first and second gate lines disposed on the insulating substrate, a data line insulated from the first and second gate lines and crossing the first and second gate line, a first thin film transistor connected to the data line and the first gate line disposed in each pixel, a second thin film transistor connected to the data line and the second gate line disposed in each pixel, a passivation layer disposed on the first and second thin film transistors, first and second subpixel electrodes connected to the first and second thin film transistors, respectively, and partitioned into a plurality of domains by a plurality of slits, a control electrode disposed on the passivation layer and at least partially overlapping each slit, and a plurality of domain forming members arranged parallel to the slits in an alternating fashion and partitioning the first and second subpixel electrodes into a plurality of domains.

The present invention also discloses an LCD including an insulating substrate, a gate line disposed on the insulating substrate, a data line insulated from the gate line and crossing the gate line, a thin film transistor connected to the gate line and the data line, a passivation layer disposed on the thin film transistor, a first subpixel electrode connected to the thin film transistor and partitioned into a plurality of domains by a plurality of slits, a second subpixel electrode spaced apart from the first subpixel electrode, a coupling electrode, a control electrode, and a plurality of domain forming members. The coupling electrode is connected to the second subpixel electrode, insulated from the first subpixel electrode, and overlaps the first subpixel electrode. The control electrode is disposed on the passivation layer and at least partially overlaps each slit, and the plurality of domain forming members are arranged parallel to the slits in an alternating fashion and partitions the first and second pixel electrodes into a plurality of domains.

The present invention also discloses a method of fabricating an LCD including forming a gate line on an insulating substrate, forming a data line that is insulated from the gate line and crosses the gate line, forming a passivation layer on the gate line and the data line, forming a pixel electrode that is partitioned into a plurality of domains by a plurality of first slits, and forming a control electrode that is disposed on the passivation layer and at least partially overlaps each first slit.

It is to be understood that both the foregoing general description and the following details description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
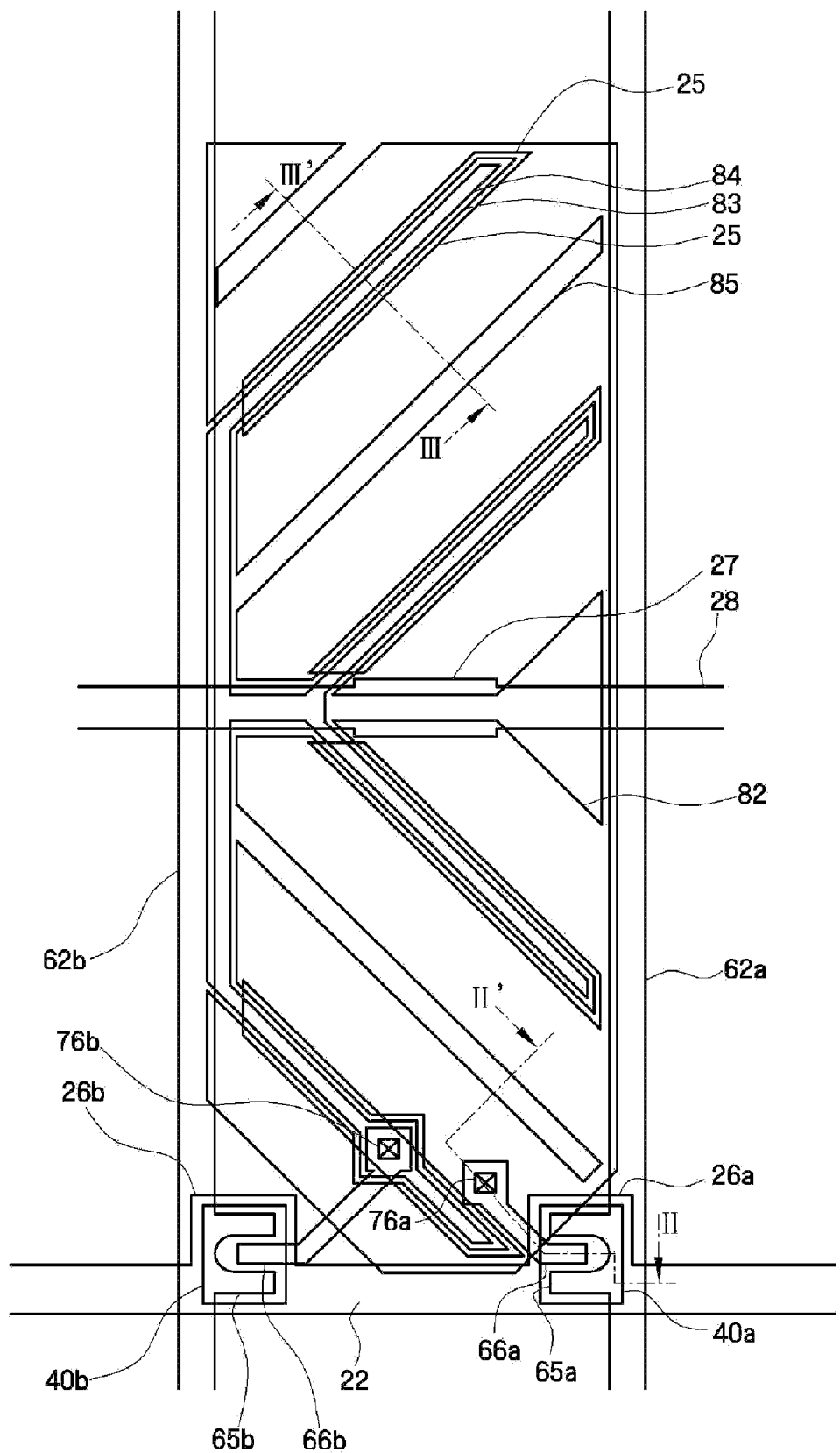
FIG. 1 is a layout view of a liquid crystal display (LCD) according to a first exemplary embodiment of the present invention.

The invention is described more fully with reference to the accompanying drawings, in which embodiments of the invention are shown. The invention may, however, be embodied in many different forms and should not be construed as being limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Spatially relative terms, such as "below," "beneath," "lower," "above," "upper," and the like, may be used herein for ease of description to describe one device or element's relationship to another device(s) or element(s) as illustrated in the drawings. It will be understood that the spatially relative terms are intended to encompass different orientations of the device in use or operation in addition to the orientation depicted in the drawings.

Hereinafter, a liquid crystal display (LCD) according to an exemplary embodiment of the present invention will be described with reference to FIG. 1, FIG. 2, and FIG. 3. The LCD according to the present exemplary embodiment includes a thin film transistor display panel having a thin film transistor array disposed thereon, a common electrode display panel facing the thin film transistor display panel, and a liquid crystal layer interposed between the thin film transistor display panel and the common electrode display panel.

Figure 2:
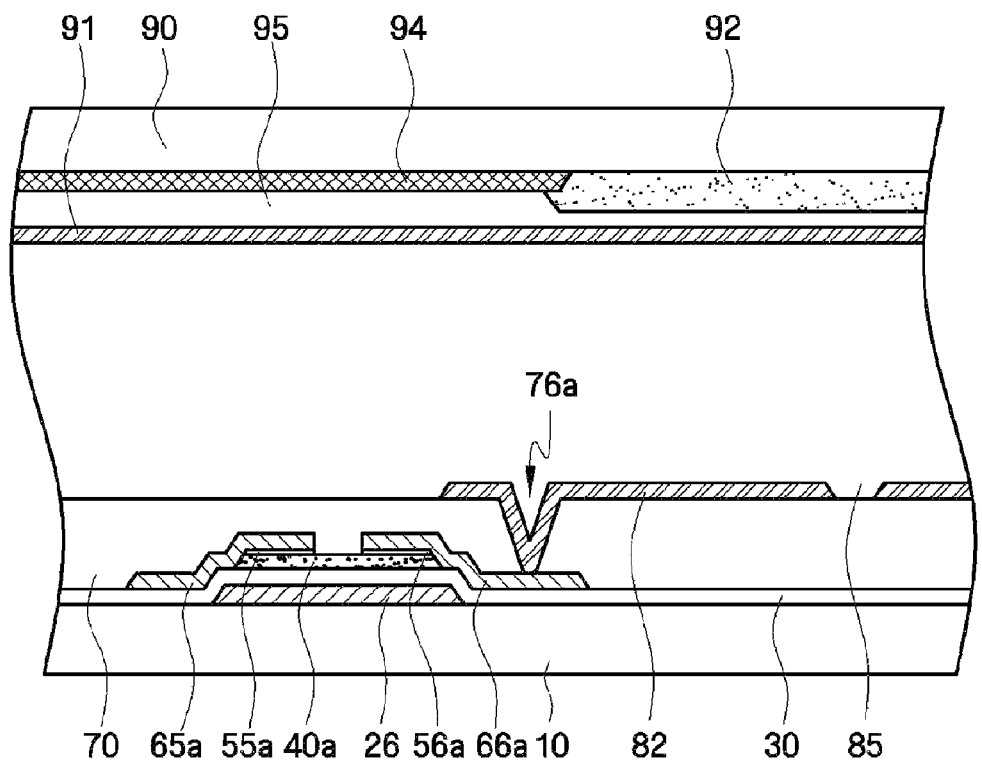
FIG. 2 is a cross-sectional view of the LCD taken along line II-II' of FIG. 1.

FIG. 1 is a layout view of an LCD according to a first exemplary embodiment of the present invention. FIG. 2 is a cross-sectional view of the LCD taken along line II-II' of FIG. 1. FIG. 3 is a cross-sectional view of the LCD taken along line III-III' of FIG. 1.

A gate line 22 is disposed on a first insulating substrate 10, which may include transparent glass or the like. The gate line 22 extends in a horizontal direction and transmits a gate signal. In addition, the gate line 22 is allocated to each pixel. The gate line 22 has a pair of first and second protruding gate electrodes 26a and 26b. The gate line 22 and the first and second gate electrodes 26a and 26b are collectively referred to as a gate wiring.

A storage line 28 is also disposed on the first insulating substrate 10. The storage line 28 horizontally extends across a pixel region and is substantially parallel to the gate line 22. In addition, a wide storage electrode 27, which is connected to the storage line 28, is disposed on the first insulating substrate 10. The storage electrode 27 overlaps a pixel electrode 82 and thus forms a storage capacitor, which enhances the charge storage capability of a pixel. The storage electrode 27 and the storage line 28 are collectively referred to as a storage wiring. In the present exemplary embodiment, the storage wiring overlaps the center of the pixel region. However, the shape and disposition of the storage wiring may vary. Furthermore, if sufficient storage capacitance is generated by the overlapping of the pixel electrode 82 and the gate line 22, the storage wiring may be omitted.

The gate wiring and the storage wiring may include aluminum (Al)-based metal, such as aluminum or an aluminum alloy, silver (Ag)-based metal, such as silver or a silver alloy, copper (Cu)-based metal, such as copper or a copper alloy, molybdenum (Mo)-based metal, such as molybdenum or a molybdenum alloy, chrome (Cr), titanium (Ti), or tantalum (Ta). In addition, the gate wiring and the storage wiring may each have a multi-film structure composed of two conductive films (not shown) with different physical characteristics. One of the two conductive films may be formed of metal with low resistivity, such as aluminum-based metal, silver-based metal, or copper-based metal, in order to reduce a signal delay or a voltage drop of the gate wiring and the storage wiring. The other one of the conductive films may be formed of a different material, in particular, a material having superior contact characteristics with indium tin oxide (ITO) and indium zinc oxide (IZO), such as molybdenum-based metal, chrome, titanium, or tantalum. Examples of the multi-film structure include a combination of a chrome lower film and an aluminum upper film and a combination of an aluminum lower film and a molybdenum upper film. However, the gate wiring and the storage wiring may include various metal and conductors.

A gate insulating film 30, which may include silicon nitride (SiN$_x$), is disposed on the gate line 22 and the storage wiring.

A pair of semiconductor layers 40a and 40b, which may include hydrogenated amorphous silicon or polycrystalline silicon, are disposed on the gate insulating film 30. The semiconductor layers 40a and 40b may each have various shapes, such as an island shape or a stripe shape. In the present exemplary embodiment, the semiconductor layers 40a and 40b have island shapes.

Ohmic contact layers 55a and 56a, which may include silicide or n+ hydrogenated amorphous silicon doped with n-type impurities in high concentration, are disposed on the semiconductor layers 40a and 40b, respectively. That is, a pair of the ohmic contact layers 55a and 56a are disposed on the semiconductor layers 40a and 40b.

A pair of first and second data lines 62a and 62b and a pair of first and second drain electrodes 66a and 66b respectively corresponding to the first and second data lines 62a and 62b are disposed on the ohmic contact layers 55a and 56a and the gate insulating film 30.

The first and second data lines 62a and 62b extend in a vertical direction, cross the gate line 22 and the storage line 28, and apply a data voltage and a control voltage to the pixel electrode 82 and a control electrode 84, respectively. First and second source electrodes 65a and 65b extending toward the first and second drain electrodes 66a and 66b are disposed in the first and second data lines 62a and 62b, respectively. As shown in FIG. 1, the first data line 62a transmits a data signal to the pixel electrode 82, and the second data line 62b applies the control voltage to a control electrode 84.

The first and second data lines 62a and 62b, the first and second source electrodes 65a and 65b, and the first and second drain electrodes 66a and 66b are collectively referred to as a data wiring.

The data wiring may be formed of chrome, molybdenum-based metal, or refractory metal, such as tantalum or titanium. In addition, the data wiring may have a multi-film structure composed of a lower film (not shown), which may be formed of refractory metal, and an upper film (not shown) which may be formed of a material with low resistivity. As described above, examples of the multi-film structure include a combination of a chrome lower film and an aluminum upper film and a combination of an aluminum lower film and a molybdenum upper film. Alternatively, the multi-film structure may be a triple-film structure having molybdenum-aluminum-molybdenum films.

The first and second source electrodes 65a and 65b at least partially overlap the semiconductor layers 40a and 40b, respectively. In addition, the first and second drain electrodes 66a and 66b respectively face the first and second source electrodes 65a and 65b with respect to the gate electrodes 26a and 26b and at least partially overlap the semiconductor layers 40a and 40b, respectively. The ohmic contact layers 55a and 56a described above are disposed between the semiconductor layers 40a and 40b, which are disposed under the ohmic contact layers 55a and 56a, and the first and second source electrodes 65a and 65b and the first and second drain electrodes 66a and 66b, which are disposed on the ohmic contact layers 55a and 56a. The ohmic contact layers 55a and 56a may reduce contact resistance.

A passivation layer 70 is formed on the data wiring and exposed portions of the semiconductor layers 40a and 40b. The passivation layer 70 may include an inorganic material, such as silicon nitride or silicon oxide, an organic material having photosensitivity and superior planarization characteristics, or a low-k dielectric material formed by plasma enhanced chemical vapor deposition (PECVD), such as a-Si:C:O or a-Si:O:F. For example, the passivation layer 70 may include a lower inorganic layer and an upper organic layer in order to protect the exposed portions of the semiconductor layers 40a and 40b while taking advantage of the superior characteristics of an organic layer. Furthermore, a red (R), green (G), or blue (B) color filter layer may be used as the passivation layer 70.

First and second contact holes 76a and 76b are formed in the passivation layer 70. The pixel electrode 82 and the control electrode 84 are connected to the first and second drain electrodes 66a and 66b by the first and second contact holes 76a and 76b, respectively. Therefore, the pixel electrode 82 and the control electrode 84 are supplied with the data voltage and the control voltage from the first and second drain electrodes 66a and 66b, respectively.

The pixel electrode 82 to which the data voltage has been applied generates an electric field together with a common electrode 91 of the common electrode display panel, thereby determining the alignment of liquid crystal molecules between the pixel electrode 82 and the common electrode 91.

The pixel electrode 82 is partitioned into a plurality of domains by first and second slits 83 and 85. The first and second slits 83 and 85 may be oblique lines at an angle of approximately 45 or −45 degrees with respect to the gate line 22. The first and second slits 83 and 85 are arranged in an alternating fashion.

The first slit 83 is formed as an open aperture region having a predetermined width. The control electrode 84, to which the control voltage is applied, overlaps the first slit 83 and is disposed in the first slit 83. A width of the first slit 83 may be 4 to 15 μm, and that of the control electrode 84 may be 4 to 10 μm. The control electrode 83 may be narrower than the first slit 83, and the control electrode 84 may be formed within the first slit 83.

The generation of texture may be adjusted by controlling the alignment of liquid crystal molecules around the first slit 83 using the control voltage applied to the control electrode 84. The control voltage applied to the control electrode 84 may be higher than the data voltage applied to the pixel electrode 82.

Figure 3:
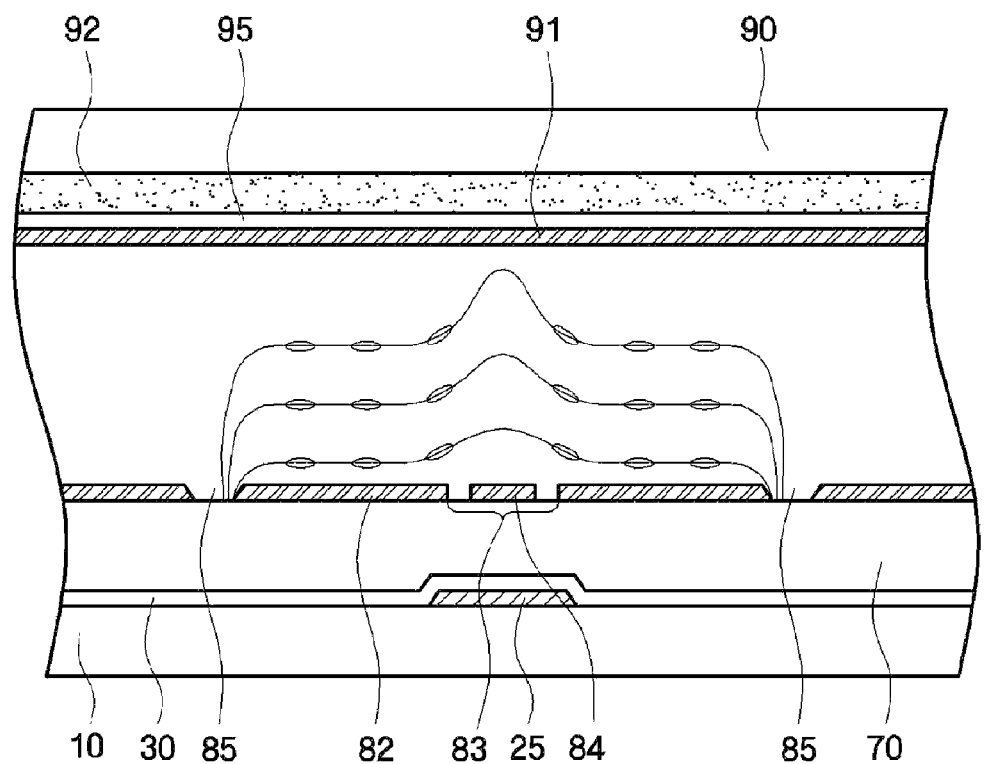
FIG. 3 is a cross-sectional view of the LCD taken along line III-III' of FIG. 1.

When voltages are applied to the pixel electrode 82, the control electrode 84, and the common electrode 91, an electric field forming equipotential surfaces is generated between them as shown in FIG. 3. That is, when an electric field is formed in the liquid crystal layer, liquid crystal molecules tilt perpendicular to the control electrode 84 and the first and second slits 83 and 85. Accordingly, the liquid crystal molecules tilt in four directions according to regions defined by the control electrode 84 and the first and second slits 83 and 85, thereby securing visibility in the four directions.

When a control voltage that is a little higher than the data voltage applied to the pixel electrode 82 is applied to the control electrode 84, equipotential lines that are convex toward the common electrode 91 are formed within the liquid crystal layer in the vicinity of the control electrode 84 as shown in FIG. 3. Accordingly, the liquid crystal molecules on both sides of the control electrode 84 tilt in opposite directions due to the liquid crystal molecules arranged along the equipotential lines.

The control electrode 84 may overlap the first slit 83 and may be formed on the same plane as the pixel electrode 82. The control electrode 84 and the pixel electrode 82 may be formed of the same material, such as ITO or IZO. The pixel electrode 82 and the control electrode 84 may be formed in separate processes in consideration of the gap between the first slit 83 and the control electrode 84. Alternatively, they may be patterned together in a single mask process.

The second slit 85 is formed on both sides of the first slit 83 in which the control electrode 84 is formed. Like the first slit 83, the second slit 85 is formed as an aperture region having a predetermined width. The control electrode 84 and the first and second slits 83 and 85 modify an electric field generated by the pixel electrode 82 and the common electrode 91 and form different electric fields in a plurality of regions, thereby controlling the direction in which the liquid crystal molecules are aligned. The electric field modified by the control electrode 84 and the first and second slits 83 and 85 can be used to control not only light transmittance, but also texture generated around the first slit 83. The second slit 85 described above is merely a domain formation portion according to an exemplary embodiment of the present invention. That is, domains may be formed using various methods, such as protrusions.

In order to prevent light leakage in the vicinity of the first slit 83, a light shielding film 25 may be formed under the first slit 83. The light shielding film 25 may be wider than the first slit 83. In some cases, the light shielding film 25 may include the same material and be formed in the same process as the gate line 22 or the first and second data lines 62a and 62b.

An alignment film (not shown), which can align the liquid crystal layer, may be coated on the pixel electrode 82 and the passivation layer 70.

The common electrode display panel and the LCD will now be described in detail with reference to FIG. 2.

A black matrix 94 preventing light leakage and defining the pixel region is disposed on a second insulating substrate 90, which may include transparent glass. The black matrix 94 may be formed in corresponding portions of the gate line 22, the first and second data lines 62a and 62b, and a corresponding portion of a thin film transistor. In addition, the black matrix 94 may have various shapes in order to prevent the light leakage in the vicinity of the pixel electrode 82 and the thin film transistor. The black matrix 94 may be formed of metal (metal oxide), such as chrome or chrome oxide, or organic black resist.

In addition, R, G, and B color filters 92 may be sequentially arranged in the pixel region between the black matrices 94.

An overcoat layer 95 may be formed on the R, G, and B color filters 92 in order to planarize their step heights.

The common electrode 91 formed of a transparent conductive material, such as ITO or IZO, is disposed on the overcoat layer 95. The common electrode 91 faces the pixel electrode 82, and the liquid crystal layer is interposed between the common electrode 91 and the pixel electrode 82.

The alignment film (not shown) aligning the liquid crystal molecules may be coated on the common electrode 91.

If lower and upper display panels structured as described above are arranged, coupled to each other, and then vertically aligned by injecting liquid crystal material therebetween, the basic structure of the LCD according to the present exemplary embodiment is completed.

When no electric field is applied between the pixel electrode 82 and the common electrode 91, the liquid crystal molecules included in the liquid crystal layer are aligned perpendicular to the lower and upper display panels and the liquid crystal molecules have negative dielectric anisotropy.

The LCD includes the basic structure, as well as elements added to the basic structure, such as a polarizer and a backlight. A polarizer may be installed on each side of the basic structure. One of two transmission axes of each polarizer may be disposed parallel to the gate line 22, and the other one of the transmission axes may be disposed perpendicular to the gate line 22.

If an electric field is applied between the thin film transistor display panel and the common electrode display panel, an electric field perpendicular to the two display panels is formed in most regions. However, a horizontal electric field is formed around the first and second slits 83 and 85 of the pixel electrode 82. The horizontal electric field helps the alignment of the liquid crystal molecules in each domain.

Since the liquid crystal molecules according to the present exemplary embodiment have negative dielectric anisotropy, when an electric field is applied to the liquid crystal molecules, the liquid crystal molecules in each domain tilt perpendicular to the first and second slits 83 and 85 that define the domains. Accordingly, the liquid crystal molecules tilt in opposite directions from the first and second slits 83 and 85. In addition, since the first and second slits 83 and 85 are symmetrical to each other with respect to the center of each pixel, the liquid crystal molecules tilt in four directions that are each at an angle of substantially 45 or −45 degrees with respect to the gate line 22. The liquid crystal molecules tilting in the four directions compensate for their respective optical characteristics and thus widen the viewing angle of the LCD.

Figure 4A:
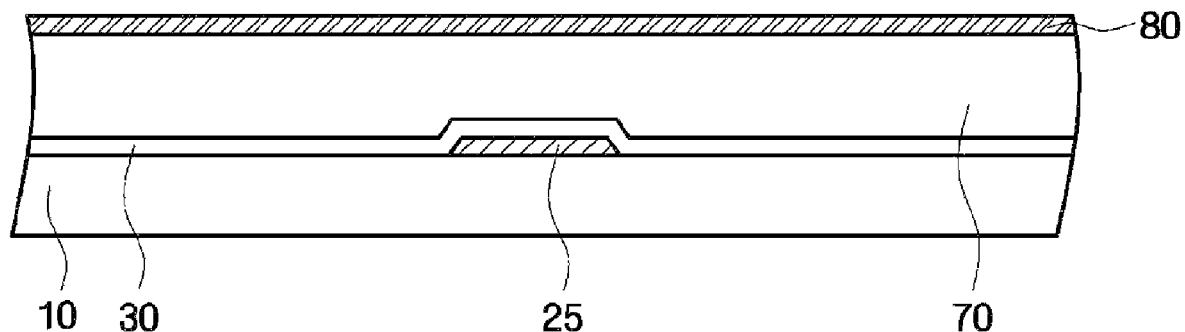
FIG. 4A and FIG. 4B are cross-sectional views sequentially showing a method of fabricating an LCD according to an exemplary embodiment of the present invention.
Figure 4B:
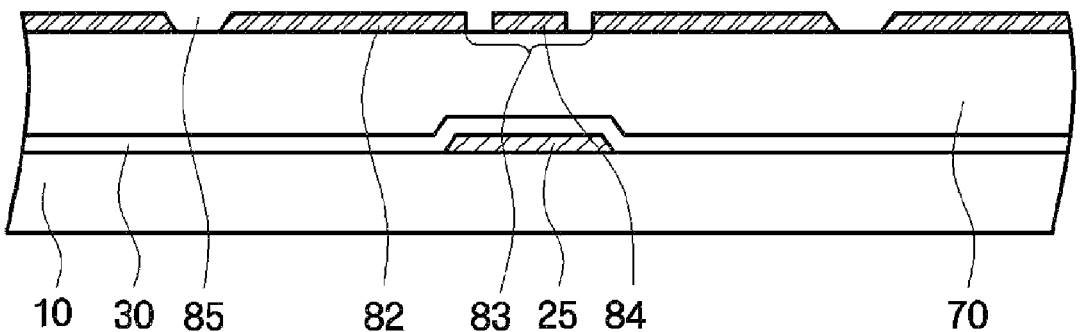

A method of fabricating an LCD according to an exemplary embodiment of the present invention will now be described in detail. FIG. 4A and FIG. 4B are cross-sectional views sequentially showing processing steps included in a method of fabricating an LCD according to an exemplary embodiment of the present invention.

Referring to FIG. 4A and FIG. 4B, a conductive material is stacked on an insulating substrate 10 to form a gate conductive layer (not shown). Then, the exposed gate conductive layer (not shown) is etched using an etching mask to form a gate wiring (not shown) and a storage wiring (not shown). Here, a light shielding film 25 is formed together with the gate wiring (not shown) and the storage wiring (not shown).

Next, a gate insulating film 30 is formed by stacking silicon nitride on a front surface of the resultant structure.

Then, a thin film transistor (not shown) and a data line (not shown) are formed. In addition, silicon nitride is stacked on the resultant structure and then patterned to form a passivation layer 70.

Referring to FIG. 4A, a conductive film 80 for an electrode is deposited on the front surface of the resultant structure having the passivation layer 70. The conductive film 80 may include ITO or IZO.

Finally, referring to FIG. 4B, photolithography is performed on the front surface of the resultant structure having the ITO or IZO deposited thereon. Consequently, a pixel electrode 82, a control electrode 84, and first and second slits 83 and 85 are formed.

Figure 5A:
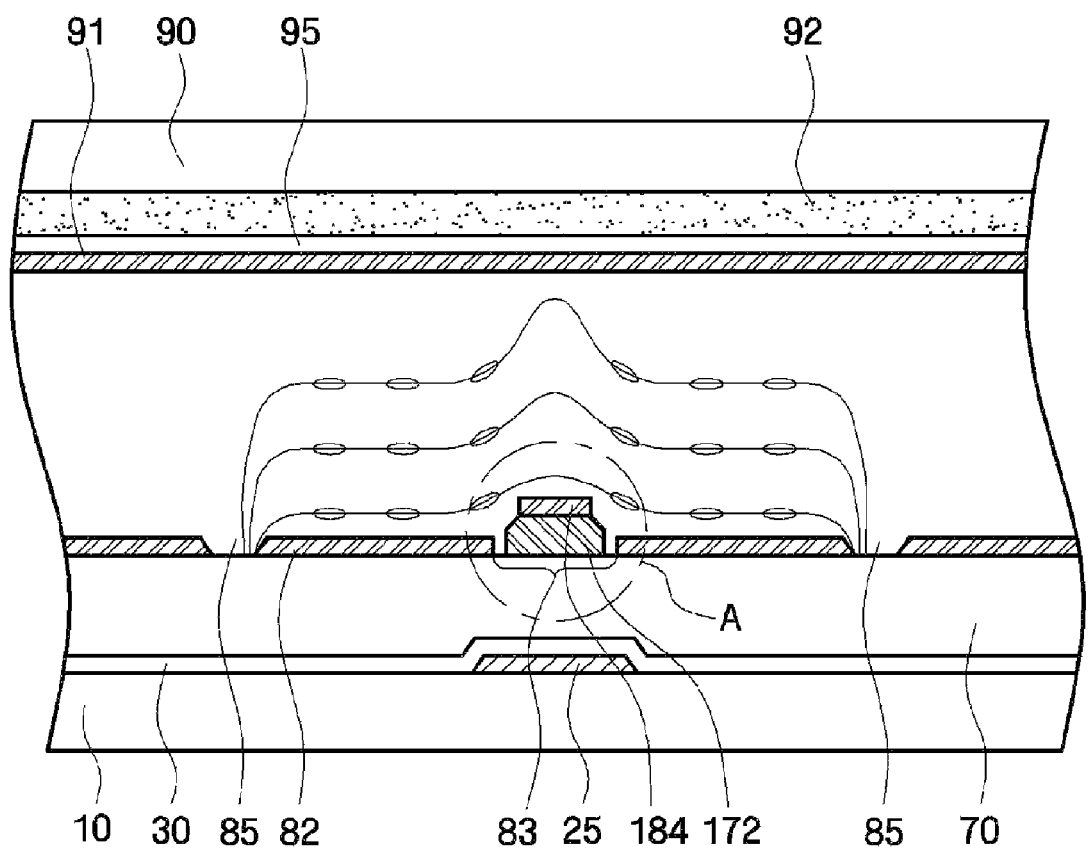
FIG. 5A is a cross-sectional view of a first modified example of the LCD taken along line III-III' of FIG. 1.
Figure 5B:
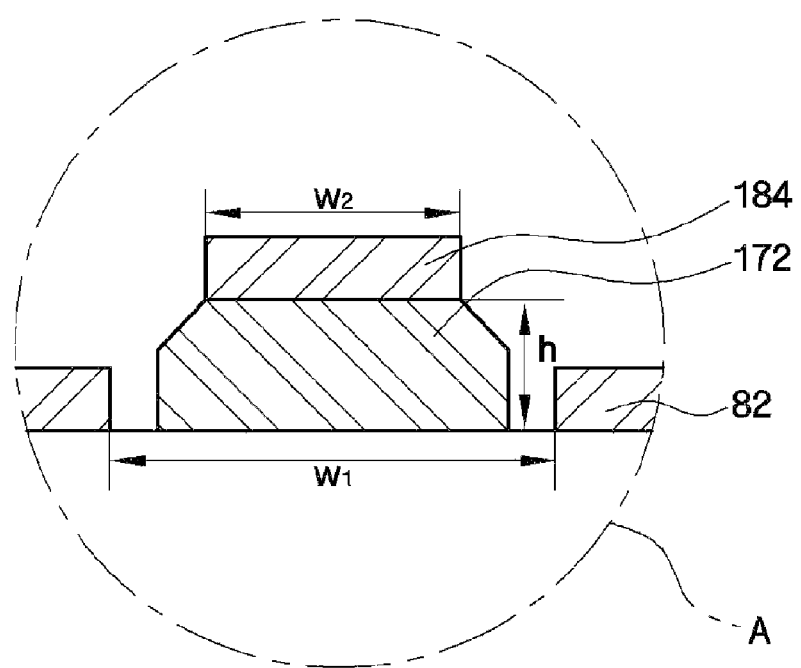
FIG. 5B is an enlarged view of region A in FIG. 5A.

An LCD according to a first modified example of the first exemplary embodiment of the present invention will now be described in detail with reference to FIG. 5A and FIG. 5B. FIG. 5A is a cross-sectional view of a first modified example of the LCD taken along line III-III' of FIG. 1. FIG. 5B is an enlarged view of region A in FIG. 5A.

The LCD according to the first modified example includes a protrusion pattern 172 that protrudes upward from a pixel electrode 82 and a control electrode 184 positioned between the pixel electrode 82 and a common electrode 91.

The protrusion pattern 172 overlaps a first slit 83, and the control electrode 184 is disposed on a top surface of the protrusion pattern 172. The protrusion pattern 172 causes the control electrode 184 to be positioned higher than the pixel electrode 82, that is, between the pixel electrode 82 and the common electrode 91. The protrusion pattern 172 may include an electrical insulator.

The height of the protrusion pattern 172 may be controlled according to a control voltage applied to the control electrode 184. That is, as the height of the protrusion pattern 172 is increased, the control voltage may decrease.

The control voltage applied to the control electrode 184 is a little higher than a voltage applied to the pixel electrode 82. Referring to FIG. 5A, equipotential surfaces formed parallel to each other above the pixel electrode 82 are upwardly concave in the vicinity of the control electrode 184 and go down the pixel electrode 82 from the second slits 85, which are formed on each side of the control electrode 184. Liquid crystal molecules are arranged parallel to each other on the equipotential surfaces, and texture is controlled by the height of the control electrode 184 and the control voltage applied to the control electrode 184.

The height h of the protrusion pattern 172 may be less than 1.5 μm. The liquid crystal molecules may have superior control characteristics when the height h of the protrusion pattern 172 may be 0.25 to 1.15 μm. For example, the height h of the protrusion pattern 172 may be approximately 0.3 μm, 0.7 μm, or 1.1 μm (see FIG. 11).

As the width $w_1$ of the first slit 83 increases, the aperture ratio is reduced. On the other hand, if the first slit 83 is too narrow, it may be difficult to secure a processing margin when forming the protrusion pattern 172 or the control electrode 184. Taking the above facts into consideration, the width $w_1$ of the first slit 83 may be approximately 4 to 15 μm.

A width $w_2$ of the control electrode 184 may be 4 to 10 μm. For example, the width $w_2$ of the control electrode 184 may be equal to the width $w_1$ of the first slit 83. However, in consideration of the manufacturing process, the width $w_2$ of the control electrode 184 disposed on a top surface of the protrusion pattern 172 may be a little narrower than that of the first slit 83. To this end, a cross-sectional area of the protrusion pattern 172 may gradually become narrower from bottom to top. That is, a longitudinal section of the protrusion pattern 172 may be semicircular, triangular, or trapezoidal.

A method of fabricating the first modified example of the LCD according to the first exemplary embodiment of the present invention will now be described in detail with reference to FIG. 6A, FIG. 6B, and FIG. 6C.

First of all, a conductive material is stacked on an insulating substrate 10 to form a gate conductive layer (not shown). Then, the exposed gate conductive layer (not shown) is etched using an etching mask. As a result, a gate wiring (not shown) and a storage wiring (not shown) are completed. Here, a light shielding film 25 is formed together with the gate wiring (not shown) and the storage wiring (not shown).

Next, a gate insulating film 30 is formed by stacking silicon nitride on a front surface of the resultant structure.

Then, a thin film transistor (not shown) and a data line (not shown) are formed. In addition, silicon nitride is stacked on the resultant structure and then patterned to form a passivation layer 70.

Figure 6A:
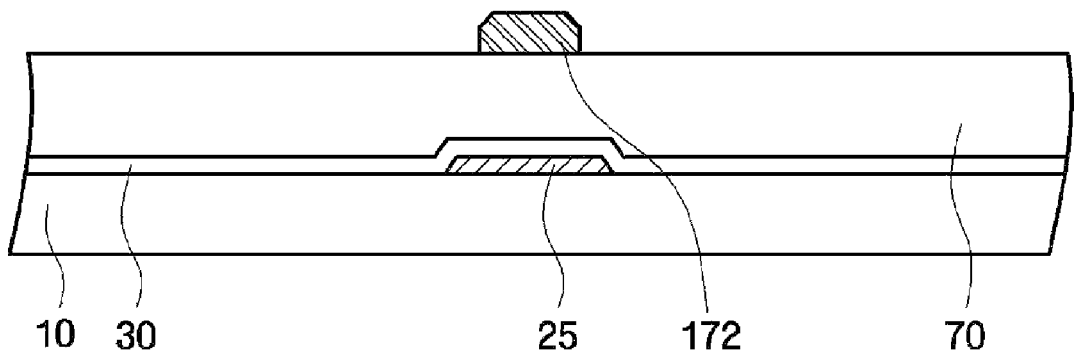
FIG. 6A, FIG. 6B, and FIG. 6C are cross-sectional views sequentially showing a method of fabricating the first modified example of the LCD of FIG. 1 according to an exemplary embodiment of the present invention.

Referring to FIG. 6A, silicon nitride is stacked on the passivation layer 70 and then patterned to form the protrusion pattern 172.

Figure 6B:
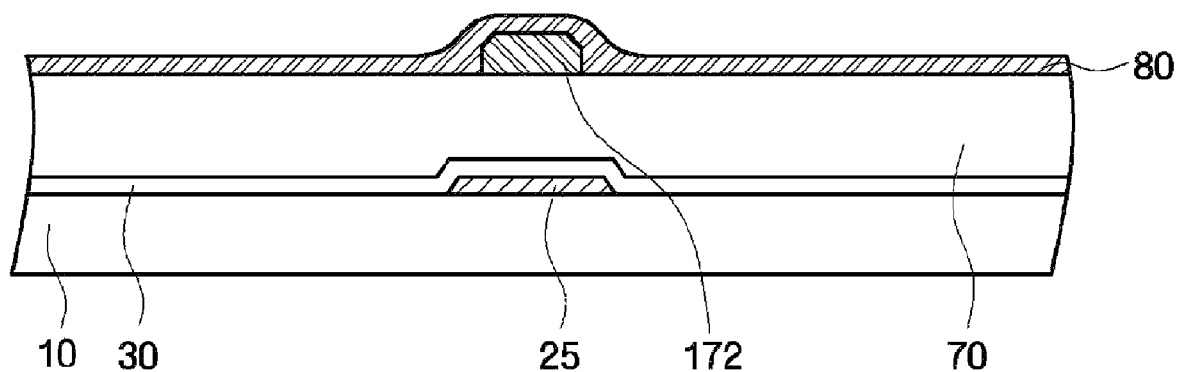

Referring to FIG. 6B, a conductive film 80 for an electrode is deposited on front surfaces of the passivation layer 70 and the protrusion pattern 172. The conductive film 80 may include ITO or IZO.

Figure 6C:
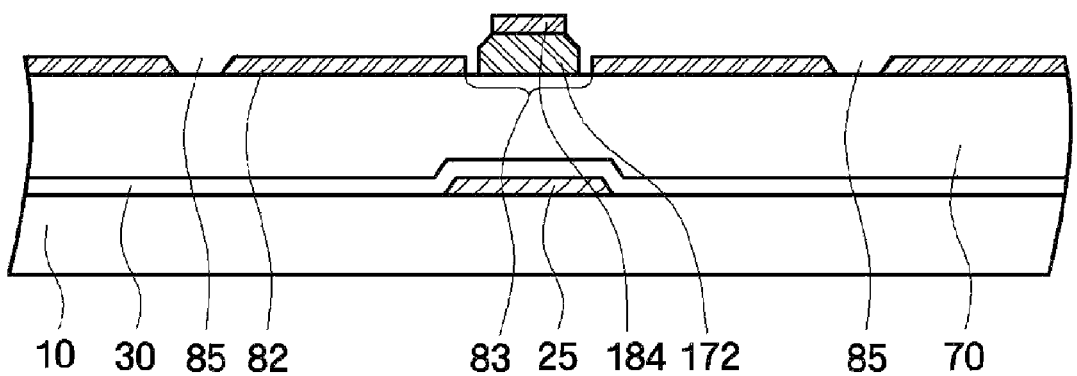

Finally, referring to FIG. 6C, photolithography is performed on the conductive film 80 that was deposited on the front surfaces of the passivation layer 70 and the protrusion pattern 172. Consequently, the control electrode 184, the pixel electrode 82, and the first and second slits 83 and 85 are formed.

Figure 7:
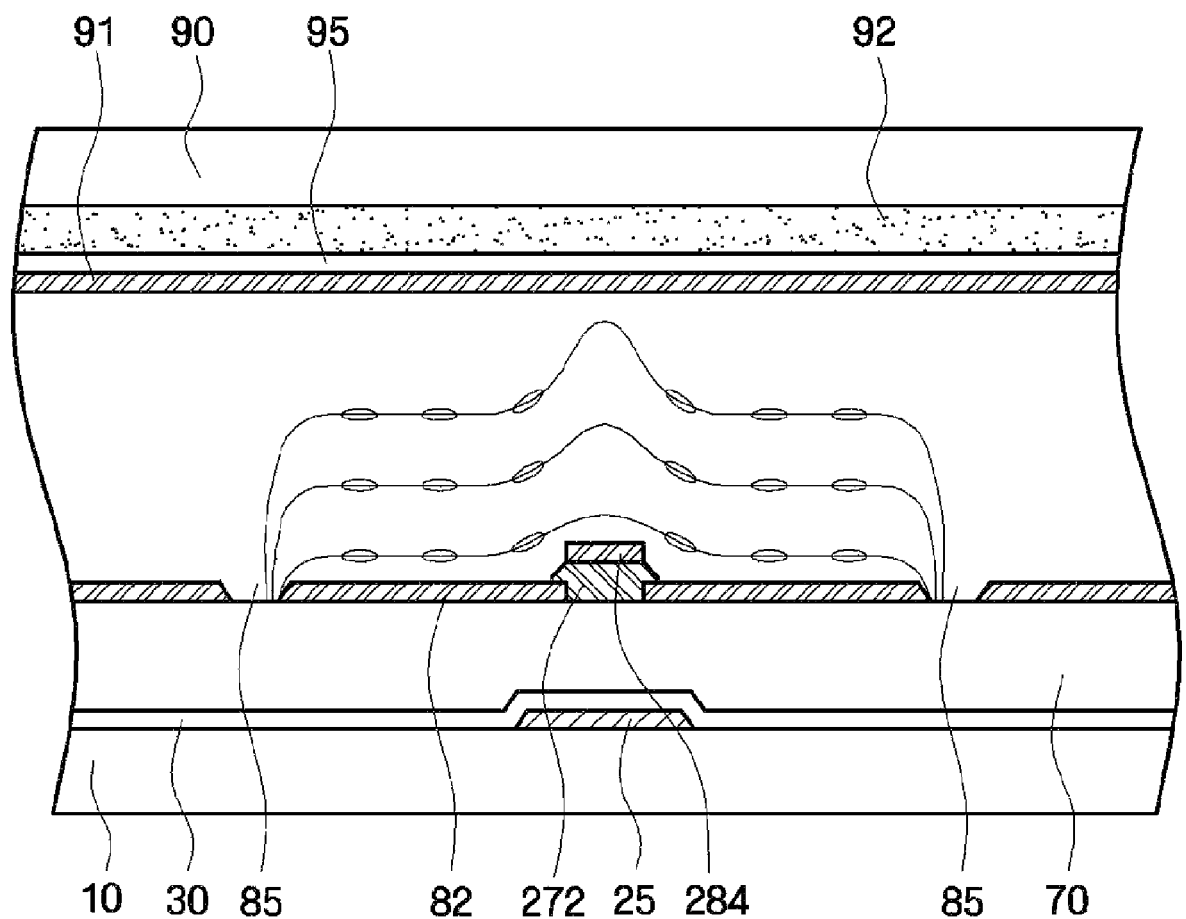
FIG. 7 is a cross-sectional view of a second modified example of the LCD taken along line III-III' of FIG. 1.

An LCD according to a second modified example of the first exemplary embodiment of the present invention will now be described in detail with reference to FIG. 7. FIG. 7 is a cross-sectional view of a second modified example of the LCD taken along line III-III' of FIG. 1.

The LCD according to the second modified example has a structure in which a protrusion pattern 272 partially overlaps a pixel electrode 82.

A lower portion of the protrusion pattern 272 is inserted into a first slit 83, and an upper portion of the protrusion pattern 272, on which a control electrode 284 is formed, partially overlaps the pixel electrode 82. When necessary, the width $w_1$ of the first slit 83 may be controlled to be wider or narrower than the width $w_2$ of the control electrode 284. That is, since the lower portion of the protrusion pattern 272 is inserted into the first slit 83 and the upper portion of the protrusion 272 is formed above the pixel electrode 82, the width of the upper portion of the protrusion pattern 272 can be controlled regardless of the width $w_1$ of the first slit 83. Accordingly, the range within which the width $w_2$ of the control electrode 284 can be adjusted widens. Therefore, the LCD may have a structure in which the control electrode 284 partially overlaps the pixel electrode 82. However, the width $w_1$ of the first slit 83 may be made equal to that of the control electrode 284 in order to form an electric field that is most desirable for the arrangement of the liquid crystal molecules.

The pixel electrode 82, the protrusion pattern 272, and the control electrode 284 are sequentially formed so that the LCD has the structure in which the protrusion pattern 272 partially overlaps the pixel electrode 82. That is, since the pixel electrode 82 and the control electrode 284 are formed in separate processes, it may be easy to make the widths of the pixel electrode 82 and the control electrode 284 equal.

Here, if a light shielding film 25 is formed under the control electrode 284 and the first slit 83, light cannot be transmitted through the control electrode 284. Therefore, the control electrode 284 may not necessarily be formed of the same material as the pixel electrode 82, such as ITO or IZO. Instead, the control electrode 284 may be formed of an opaque metal layer.

A method of fabricating the second modified example of the LCD according to the first exemplary embodiment of the present invention will now be described in detail with reference to FIG. 8A, FIG. 8B, FIG. 8C, and FIG. 8D. FIG. 8A, FIG. 8B, FIG. 8C, and FIG. 8D are cross-sectional views sequentially showing processing steps included in the method of fabricating the second modified example of the LCD of FIG. 1.

First of all, a conductive material is stacked on an insulating substrate 10 to form a gate conductive layer (not shown). Then, the exposed gate conductive layer (not shown) is etched using an etching mask. As a result, a gate wiring (not shown) and a storage wiring (not shown) are completed. Here, the light shielding film 25 is formed together with the gate wiring (not shown) and the storage wiring (not shown).

Next, a gate insulating film 30 is formed by stacking silicon nitride on a front surface of the resultant structure.

Then, a thin film transistor (not shown) and a data line (not shown) are formed. In addition, silicon nitride is stacked on the resultant structure and then patterned to form a passivation layer 70.

ITO or IZO is deposited on a front surface of the resultant structure having the passivation layer 70.

Figure 8A:
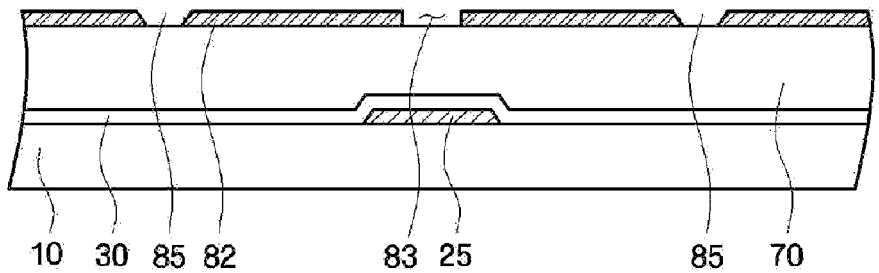
FIG. 8A, FIG. 8B, FIG. 8C, and FIG. 8D are cross-sectional views sequentially showing a method of fabricating the second modified example of the LCD of FIG. 1 according to an exemplary embodiment of the present invention.

Referring to FIG. 8A, photolithography is performed on the front surface of the resultant structure having the ITO or IZO deposited thereon. Consequently, the pixel electrode 82 and the first and second slits 83 and 85 are formed.

Figure 8B:
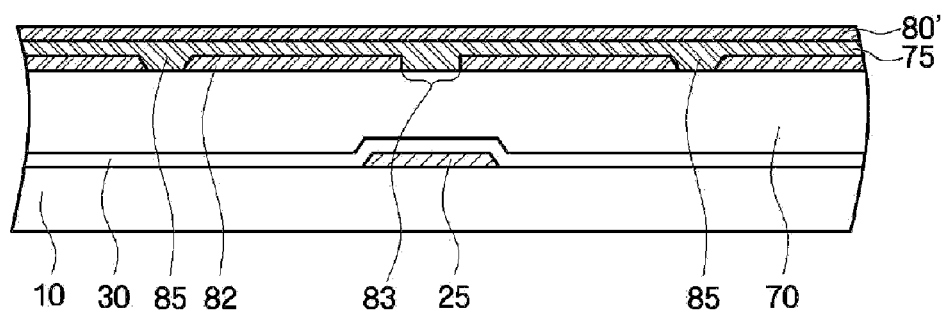

Referring to FIG. 8B, an insulating film 75 for a protrusion pattern, which may include silicon nitride, is stacked on the resultant structure of FIG. 8A, and a conductive film 80' for a control electrode is stacked on the insulating film 75 in order to form the control electrode 284. The conductive film 80' may be formed of ITO or IZO.

Figure 8C:
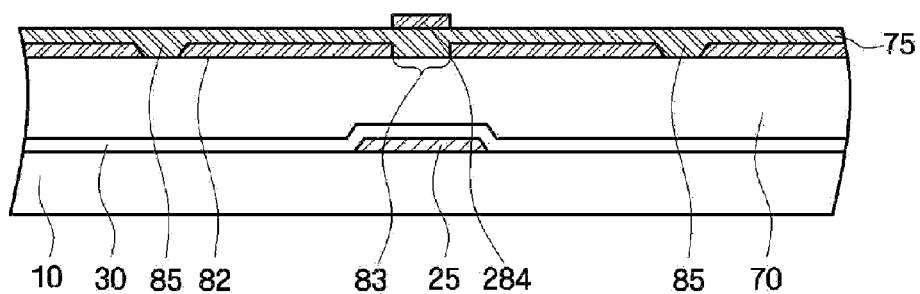
Figure 8D:
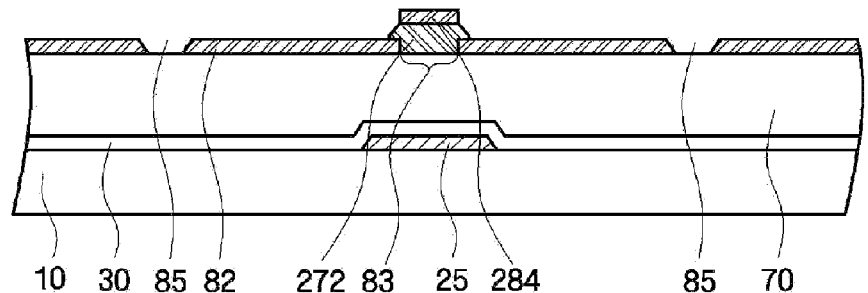

Referring to FIG. 8B and FIG. 8C, photolithography is performed on the conductive film 80' of the resultant structure of FIG. 8B. As a result, the control electrode 284 is formed. Finally, referring to FIG. 8D, the insulating film 75 is patterned, leaving only a lower portion of the insulating film 75 corresponding to the control electrode 284. Consequently, the protrusion pattern 272 is formed.

Figure 9:
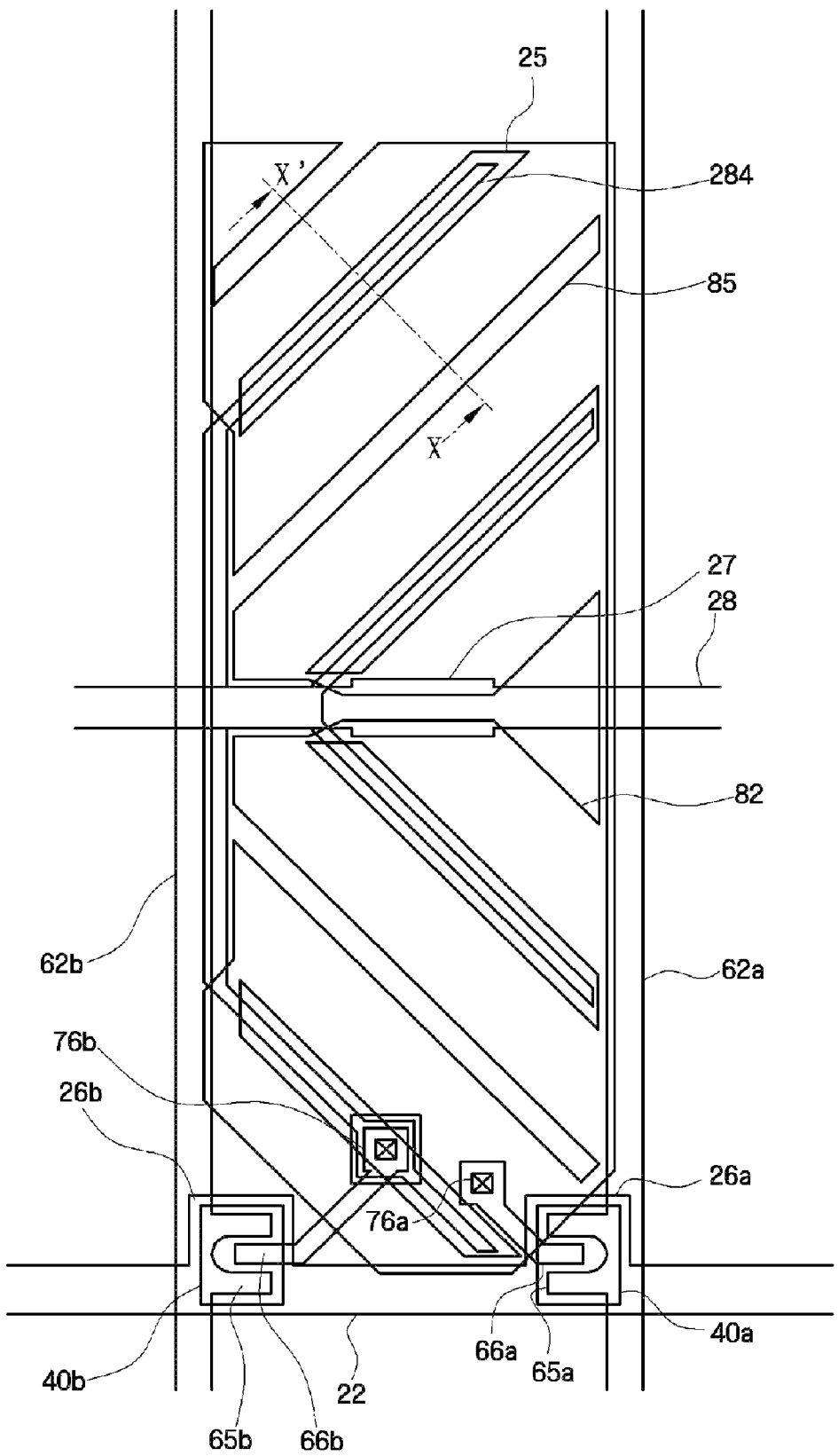
FIG. 9 is a layout view of an LCD according to a second exemplary embodiment of the present invention.
Figure 10:
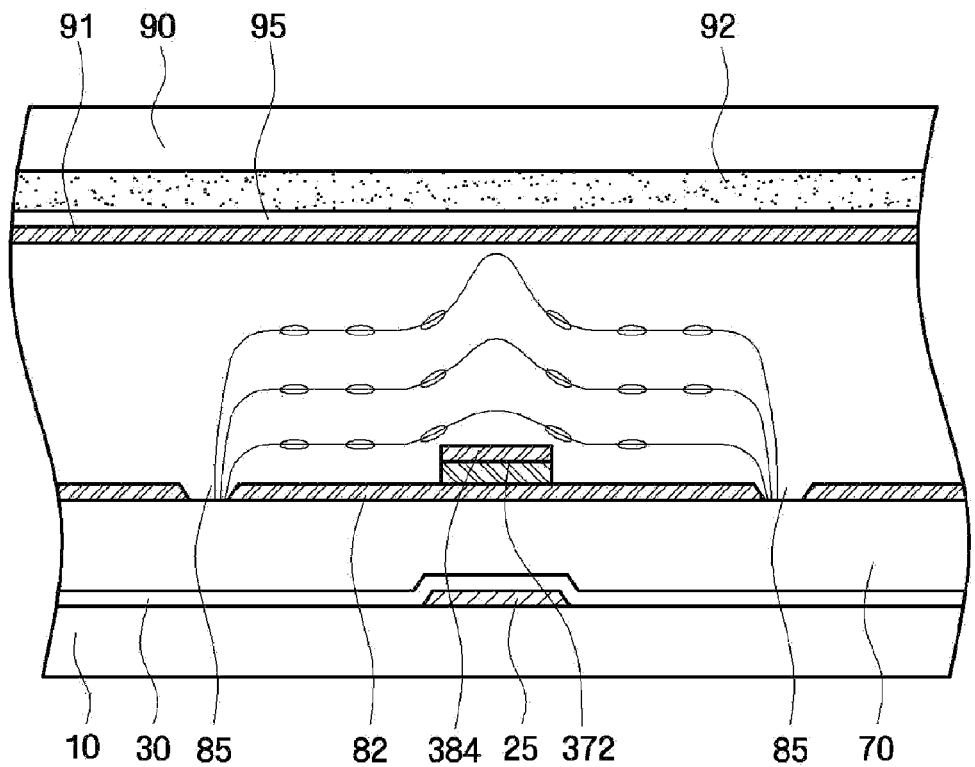
FIG. 10 is a cross-sectional view of the LCD taken along line X-X' of FIG. 9.

Hereinafter, an LCD according to a second exemplary embodiment of the present invention will be described with reference to FIG. 9 and FIG. 10. FIG. 9 is a layout view of an LCD according to a second exemplary embodiment of the present invention. FIG. 10 is a cross-sectional view of the LCD taken along line X-X' of FIG. 9.

The LCD according to the second exemplary embodiment of the present invention includes a control electrode 384 formed on a pixel electrode 82 without a slit. A control voltage, which is higher than a data voltage applied to the pixel electrode 82, is applied to the control electrode 384.

A protrusion pattern 372 is formed on the pixel electrode 82 to which a predetermined data voltage is applied, that is, on the portion of the pixel electrode 82 without a slit, and the control electrode 384 is formed on a top surface of the protrusion pattern 372. Here, the control voltage applied to the control electrode 384 is maintained higher than the data voltage applied to the pixel electrode 82. Therefore, an electric field formed by the control electrode 384, as well as an electric field formed by the pixel electrode 82 affects and thus controls liquid crystal molecules around the control electrode 384.

The pixel electrode 82 has a slit 85 arranged parallel to the control electrode 384 in an alternating fashion. The pixel electrode 82 and the control electrode 384 form equipotential surfaces as shown in FIG. 10.

In order to prevent leakage of light in the vicinity of the control electrode 384, a light shielding film 25 may be formed under the control electrode 384. The light shielding film 25 may be formed of the same material as a gate line or a data line in the same process.

Figure 11:
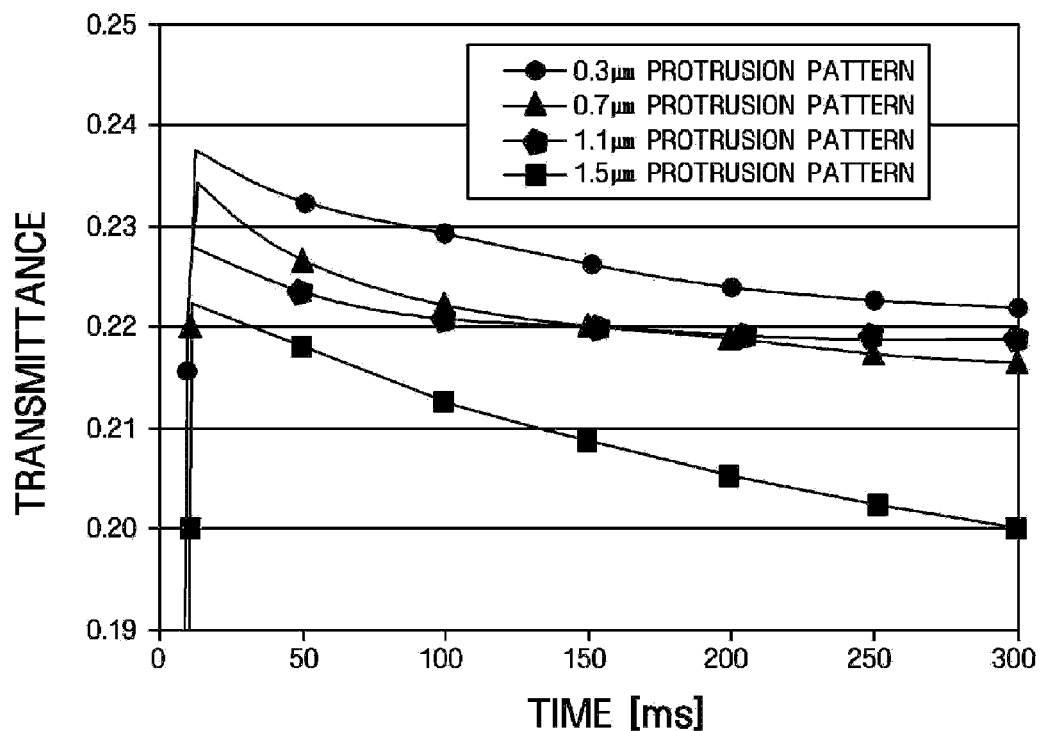
FIG. 11 is a graph showing the transmittances of LCDs over time according to an exemplary embodiment of the present invention.

A characteristic of transmittances of LCDs according to the heights of protrusion patterns will now be described in detail with reference to FIG. 11. FIG. 11 is a graph showing transmittances of LCDs over time according to an exemplary embodiment of the present invention. Specifically, FIG. 11 shows transmittance maintenance of LCDs having protrusion patterns 172, 272, and 372 whose heights are 0.3 µm, 0.7 µm, 1.1 µm, and 1.5 µm, respectively. In FIG. 11, transmittance denotes a numerical value having an arbitrary unit and is used to identify relative transmittable values of the protrusion patterns 172, 272, and 372. Referring to the graph of FIG. 11, the LCDs having the protrusion patterns 172, 272, and 372 whose heights are 0.3 µm, 0.7 µm, and 1.1 µm, respectively, exhibit better transmittances than LCDs having control electrodes 184, 284, and 384 disposed on the protrusion patterns 172, 272, and 372 whose heights are 1.5 µm.

In addition, while the transmittances of the LCDs having the protrusion patterns 172, 272, and 372 whose heights are 1.5 µm significantly drop over time, the LCDs having the protrusion patterns 172, 272, and 372 whose heights are 0.3 µm, 0.7 µm, and 1.1 µm, respectively, maintain constant transmittances although their transmittances slightly decrease over time. This is because the rotation of liquid crystal molecules around the protrusion patterns 172, 272, and 372 is hindered when the protrusion patterns 172, 272, and 372 are too high, which, in turn, reduces transmittance.

The LCD having the protrusion pattern 172 whose height is 0.3 µm shows high overall transmittance and superior transmittance maintenance.

In addition, the LCD having the protrusion pattern 372 whose height is 1.1 µm has superior transmittance maintenance since its transmittance hardly changes over time.

In this regard, the heights of the protrusion patterns 172, 272, and 372 may be maintained at 0.25 to 1.15 µm. In particular, the LCDs show superior characteristics when the heights of their protrusion patterns 172, 272, and 372 are approximately 0.3 µm, 0.7 µm, and 1.1 µm, respectively.

Figure 12:
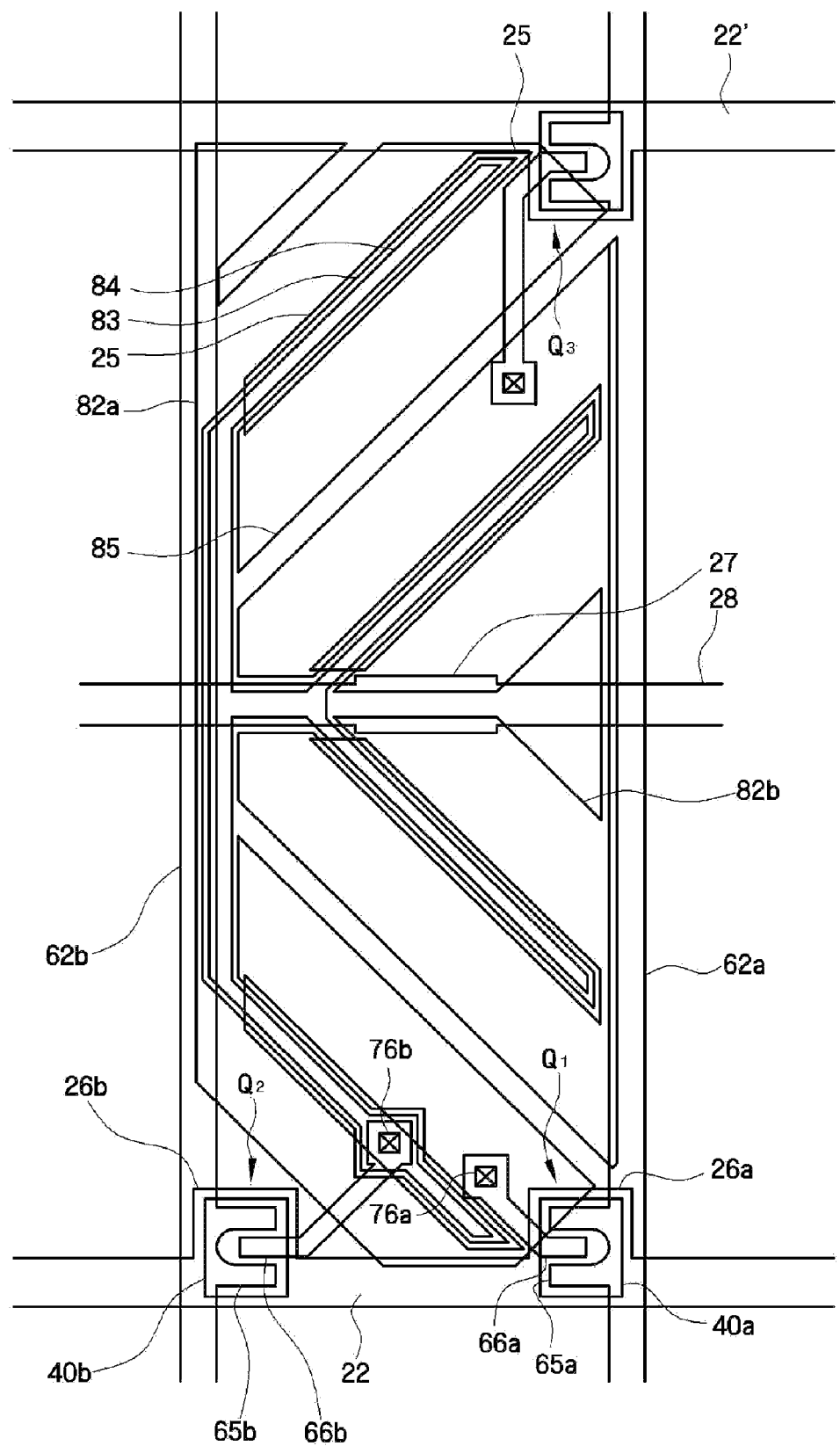
FIG. 12 is a layout view of an LCD according to a third exemplary embodiment of the present invention.
Figure 13:
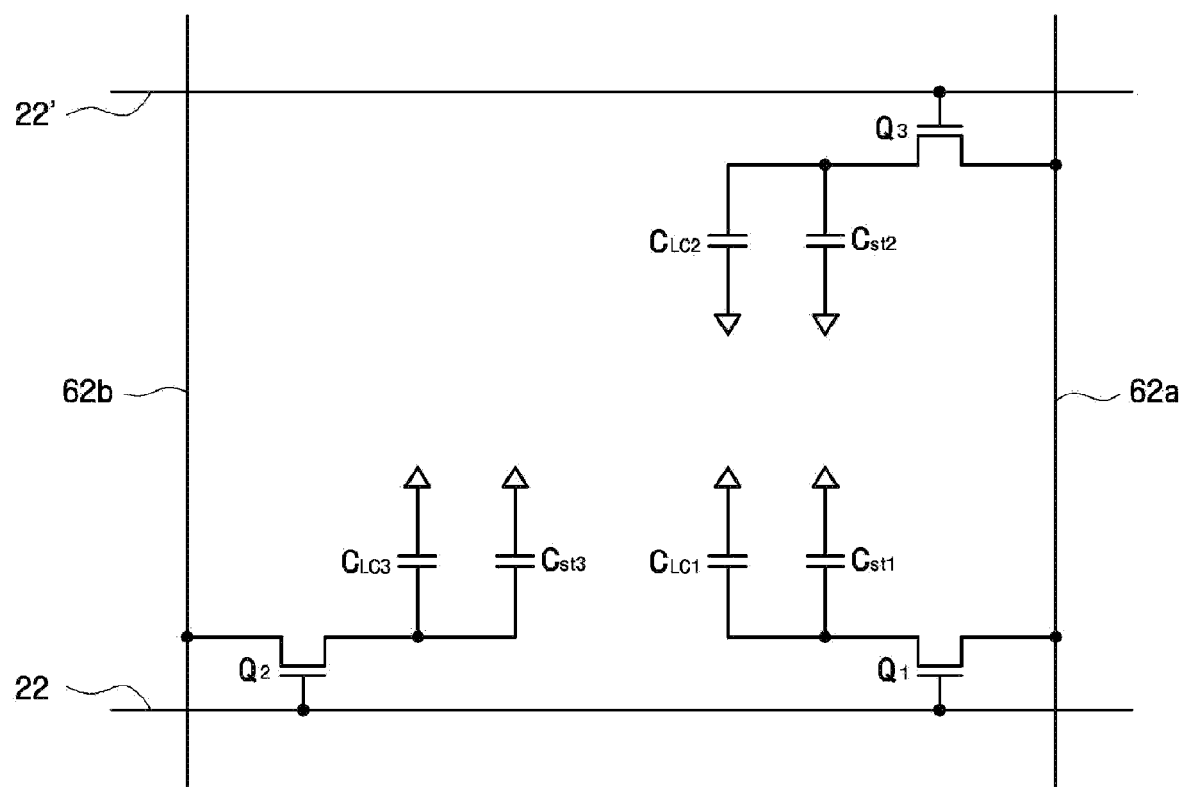
FIG. 13 is an equivalent circuit diagram of a pixel of the LCD shown in FIG. 12.

Hereinafter, an LCD according to a third exemplary embodiment of the present invention will be described with reference to FIG. 12 and FIG. 13. FIG. 12 is a layout view of an LCD according to a third exemplary embodiment of the present invention. FIG. 13 is an equivalent circuit diagram of a pixel of the LCD shown in FIG. 12.

The LCD according to the third exemplary embodiment of the present invention includes a control electrode 84 and first and second subpixel electrodes 82a and 82b. As described above, the control electrode 84 controls liquid crystal molecules using a control voltage, which is applied to the control electrode 84 through a third thin film transistor Q2.

The first and second subpixel electrodes 82a and 82b are spaced apart from each other by a predetermined distance and are insulated from each other. In addition, the first and second subpixel electrodes 82a and 82b engage with each other in a predetermined form and thus form a pixel region. The first and second subpixel electrodes 82a and 82b are connected to thin film transistors Q1 and Q3, respectively.

The first and second subpixel electrodes 82a and 82b may be cut obliquely at an angle of approximately 45 or −45 degrees with respect to a gate line 22 and thus partitioned accordingly. In addition, the control electrode 84 may be arranged parallel to the first and second subpixel electrodes 82a and 82b such that the liquid crystal molecules within each pixel tilt in four directions, thereby securing visibility in the four directions. This arrangement of the first and second subpixel electrodes 82a and 82b is a mere exemplary embodiment of the present invention. That is, the first and second subpixel electrodes 82a and 82b may be partitioned in various ways. When necessary, the first and second subpixel electrodes 82a and 82b may be partitioned into two or more subpixel electrodes.

Thin film transistors connected to the first and second subpixel electrodes 82a and 82b will hereinafter be referred to as the first and second thin film transistors Q1 and Q3, and the description of the thin film transistor Q2 connected to the control electrode 84 will be omitted.

The first and second thin film transistors Q1 and Q3 are switched on or off by data voltages applied through first and second gate lines 22 and 22', respectively. In addition, the first and second thin film transistors Q1 and Q3 are connected to a first data line 26a and apply data voltages to the first and second subpixel electrodes 82a and 82b. That is, different data voltages can be applied to the first and second subpixel electrodes 82a and 82b by the switching operations of the first and second thin film transistors Q1 and Q3.

A method of forming two thin film transistors, that is, the first and second thin film transistors Q1 and Q3, in the first and second gate lines 22 and 22' and the data line 26a in order to apply the data voltages to the first and second subpixel electrodes 82a and 82b is a mere exemplary embodiment of the present invention. Therefore, various methods may be used to apply different data voltages to the first and second subpixel electrodes 82a and 82b, such as a method of using one gate line and two data lines.

In addition, the control electrode 84 may be partitioned and may apply different control voltages to the first and second subpixel electrodes 82a and 82b. That is, the control electrode 84 may apply a necessary control voltage to each of the first and second subpixel electrodes 82a and 82b according to the data voltage applied to each of the first and second subpixel electrodes 82a and 82b through a separate path. For example, relative values of the data voltages applied to the first and second subpixel electrodes 82a and 82b and a relative value of the control voltage applied to the control electrode 84 may be constant. Here, the control electrode 84 may be partitioned for each of the first and second subpixel electrodes 82a and 82b, and each control voltage may be controlled using a separate switching device.

The first and second subpixel electrodes 82a and 82b are partitioned into a plurality of domains by a plurality of first and second slits 83 and 85, which are domain forming members.

The first slit 83 is formed as an open aperture region having a predetermined width and is formed in each of the first and second subpixel electrodes 82a and 82b. In addition, the control electrode 84, to which the control voltage is applied, overlaps the first slit 83 and is disposed in the first slit 83. A width of the first slit 83 may be 4 to 15 μm, and a width of the control electrode 84 may be 4 to 10 μm. The width of the control electrode 84 may be narrower than that of the first slit 83, and thus the control electrode 84 may be formed within the first slit 83. A voltage applied to the control electrode 84 may be a little higher than voltages applied to the first and second subpixel electrodes 82a and 82b.

A domain partition portion such as the second slit 85 may be formed on each side of the first slit 83 in which the control electrode 84 is formed. The domain partition portion and the first slit 83 modify an electric field generated by the first and second subpixel electrodes 82a and 82b and a common electrode 91 and form different electric fields in a plurality of regions, thereby controlling a direction in which the liquid crystal molecules are aligned.

Referring to FIG. 13, the pixel of the LCD includes the first, second, and third thin film transistors Q1, Q2, and Q3, first, second, and third storage capacitors $C_{st1}$, $C_{st2}$, and $C_{st3}$, and first, second, and third liquid crystal capacitors $C_{LC1}$, $C_{LC2}$, and $C_{LC3}$.

The first and second liquid crystal capacitors $C_{LC1}$ and $C_{LC2}$ are formed by the common electrode 91 and the first and second subpixel electrodes 82a and 82b. The first liquid crystal capacitor $C_{LC1}$ uses the first subpixel electrode 82a and the common electrode 91 as its terminals and has a liquid crystal layer interposed therebetween as a dielectric. In addition, the second subpixel electrode 82b and the common electrode 91, which have a liquid crystal layer interposed therebetween as a dielectric, are the terminals of the second liquid crystal capacitor $C_{LC2}$. The third liquid crystal capacitor $C_{LC3}$ is formed by the common electrode 91 and the control electrode 84 as its terminals with the liquid crystal layer interposed therebetween as the dielectric.

The first, second, and third storage capacitors $C_{st1}$, $C_{st2}$, and $C_{st3}$ are formed by a storage electrode 27, the first and second subpixel electrodes 82a and 82b overlapping the storage electrode 27, and the control electrode 84. The first subpixel electrode 82a and the storage electrode 27, which have a passivation layer 70 interposed therebetween as a dielectric, are the terminal of the first storage capacitor $C_{st1}$. The first subpixel electrode 82a and the storage electrode 27, which have the passivation layer 70 interposed therebetween as a dielectric, are the terminals of the second storage capacitor $C_{st2}$. In addition, the control electrode 84 and the storage electrode 27, which have the passivation layer 70 interposed therebetween as a dielectric, are the terminals of the third storage capacitor $C_{st3}$.

Different data voltages are applied to the first and second subpixel electrodes 82a and 82b, respectively, and a common voltage may be applied to the common electrode 91 and the storage electrode 27. When a voltage is applied to each electrode as described above, an electric field is generated between them.

The alignment of the liquid crystal molecules vary according to the intensity of an electric field generated between the above electrodes. In addition, since different voltages are applied to the first and second subpixel electrodes 82a and 82b, the liquid crystal molecules between the first and second subpixel electrodes 82a and 82b and the common electrode 91 tilt at different angles. For this reason, the first and second subpixel electrodes 82a and 82b have different luminance and lateral visibility. Therefore, if the first and second liquid crystal capacitors $C_{LC1}$ and $C_{LC2}$ and the first and second storage capacitors $C_{st1}$ and $C_{st2}$ are properly controlled, lateral visibility can be enhanced. The first, second, and third storage capacitors $C_{st1}$, $C_{st2}$, and $C_{st3}$ described above are a mere exemplary embodiment of the present invention and thus can be modified or removed when necessary.

Figure 14:
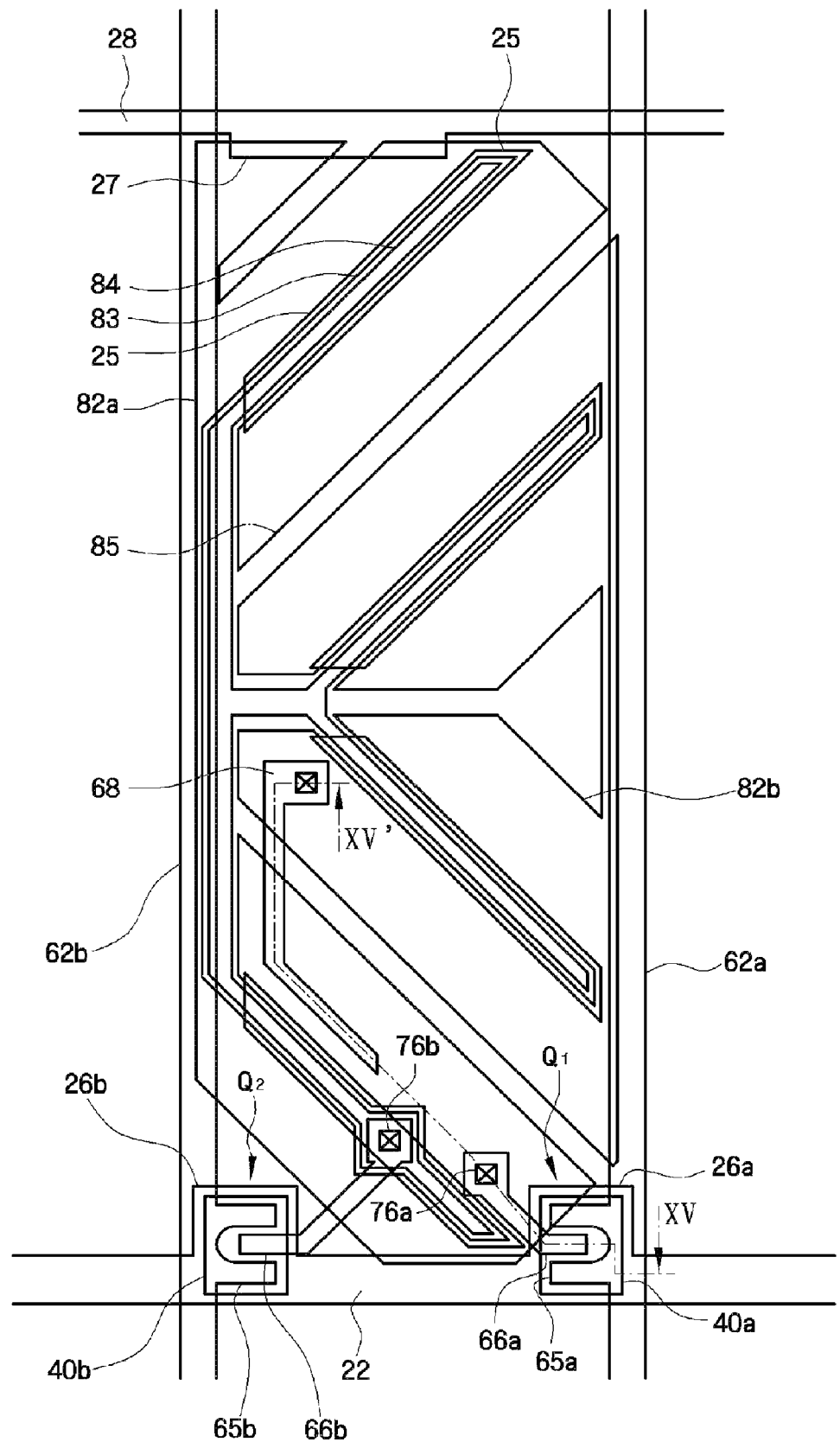
FIG. 14 is a layout view of an LCD according to a fourth exemplary embodiment of the present invention.
Figure 15:
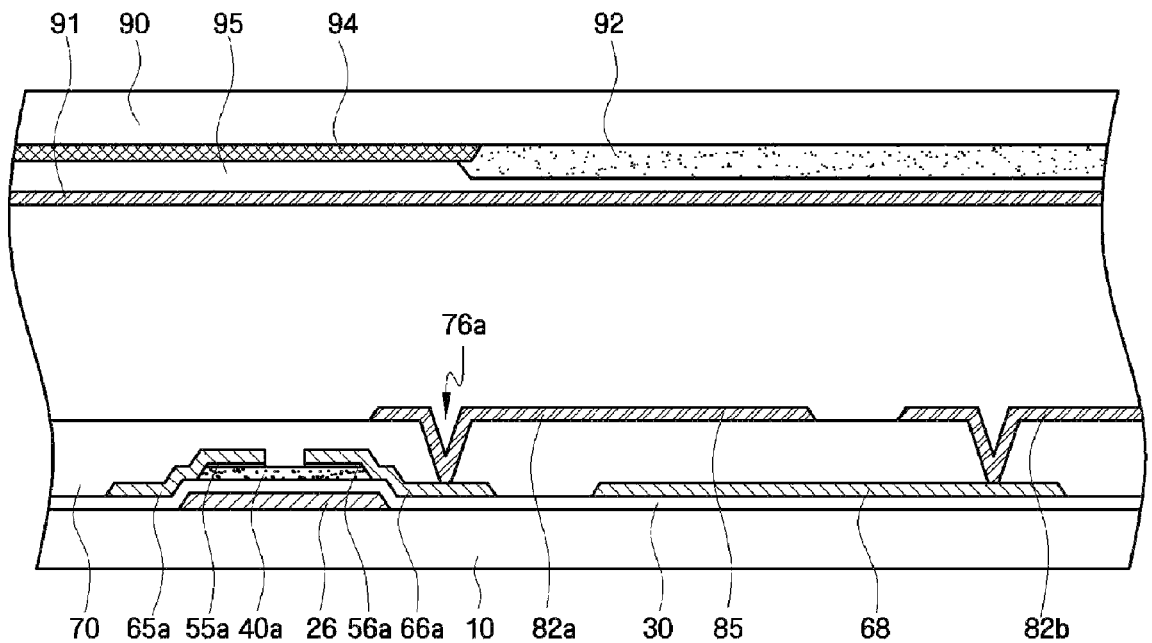
FIG. 15 is a cross-sectional view of the LCD taken along line XV-XV' of FIG. 14.
Figure 16:
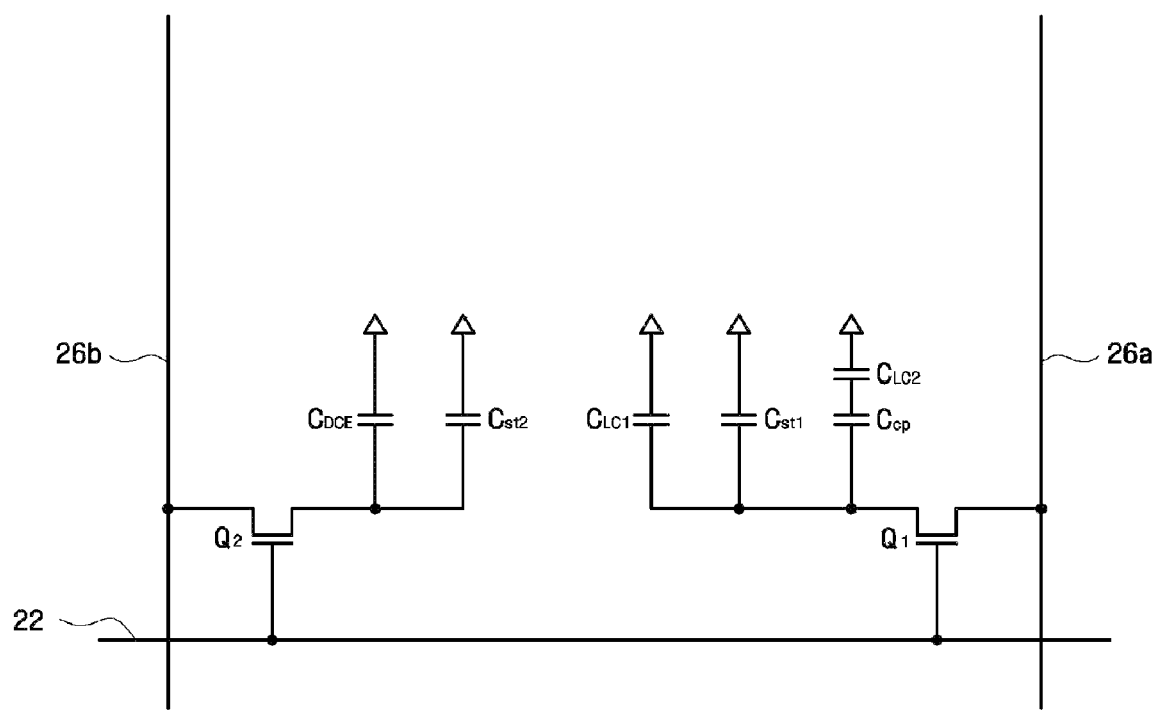
FIG. 16 is an equivalent circuit diagram of the LCD of FIG. 14.

Hereinafter, an LCD according to a fourth exemplary embodiment of the present invention will be described with reference to FIG. 14, FIG. 15, and FIG. 16. FIG. 14 is a layout view of an LCD according to a fourth exemplary embodiment of the present invention. FIG. 15 is a cross-sectional view of the LCD taken along line XV-XV' of FIG. 14. FIG. 16 is an equivalent circuit diagram of the LCD of FIG. 14.

The LCD according to the fourth exemplary embodiment of the present invention includes a control electrode 84, a first subpixel electrode 82a, a second subpixel electrode 82b, and a coupling electrode 68.

The first and second subpixel electrodes 82a and 82b are spaced apart from each other by a predetermined distance and are insulated from each other. In addition, the first and second subpixel electrodes 82a and 82b engage with each other in a predetermined form and thus form a pixel region. The first subpixel electrode 82a is connected to a thin film transistor Q1 and receives a data voltage directly from the thin film transistor Q1. A lower data voltage than the data voltage applied to the first subpixel electrode 82a is applied to the second subpixel electrode 82b by a coupling capacitor, which includes the first subpixel electrode 82a and the coupling electrode 68.

The first and second subpixel electrodes 82a and 82b may be cut obliquely at an angle of approximately 45 or −45 degrees with respect to gate lines 22 and 22' and thus partitioned accordingly. In addition, the control electrode 84 may be arranged parallel to the first and second subpixel electrodes 82a and 82b such that the liquid crystal molecules within each pixel tilt in four directions, thereby securing visibility in the four directions. This arrangement of the first and second subpixel electrodes 82a and 82b is a mere exemplary embodiment of the present invention. That is, the first and second subpixel electrodes 82a and 82b may be partitioned in various ways. When necessary, the first and second subpixel electrodes 82a and 82b may be partitioned into two or more subpixel electrodes.

The first and second subpixel electrodes 82a and 82b are coupled and operate accordingly. That is, the coupling electrode 68, which is connected to the second subpixel electrode 82b, and the first subpixel electrode 82a are insulated from each other by a dielectric interposed therebetween and overlap each other to form a "coupling capacitor." For this reason, when a data voltage is applied to the first subpixel electrode 82a, a voltage lower than the data voltage applied to the first subpixel electrode 82a is applied to the second subpixel electrode 82b.

Alternatively, the coupling electrode 68 need not be connected to the second subpixel electrode 82b. Rather, the coupling electrode 68 may be connected to the first subpixel electrode 82a. That is, if the coupling electrode 68 connected to the first subpixel electrode 82a overlaps the second subpixel electrode 82b to form a "coupling capacitor," when a data voltage is applied to the first subpixel electrode 82a, a lower voltage may be applied to the second subpixel electrode 82b.

The first and second subpixel electrodes 82a and 82b are partitioned into a plurality of domains by a plurality of first and second slits 83 and 85, which are domain forming members.

The first slit 83 is formed as an open aperture region having a predetermined width and is formed in each of the first and second subpixel electrodes 82a and 82b. In addition, the control electrode 84, to which the control voltage is applied, overlaps the first slit 83 and is disposed in the first slit 83. A width of the first slit 83 may be 4 to 15 μm, and a width of the control electrode 84 may be 4 to 10 μm. The control electrode 84 may be narrower than the first slit 83, and thus the control electrode 84 may be formed within the first slit 83. A voltage applied to the control electrode 84 may be slightly higher than voltages applied to the first and second subpixel electrodes 82a and 82b.

In addition, the control electrode 84 may be partitioned and may apply different control voltages to the first and second subpixel electrodes 82a and 82b. That is, the control electrode 84 may apply a necessary control voltage to each of the first and second subpixel electrodes 82a and 82b according to the data voltage applied to each of the first and second subpixel electrodes 82a and 82b through a separate path. For example, relative values of the data voltages applied to the first and second subpixel electrodes 82a and 82b and a relative value of the control voltage applied to the control electrode 84 may be maintained constant. Here, the control electrode 84 may be partitioned for each of the first and second subpixel electrodes 82a and 82b, and each control voltage may be controlled using a separate switching device.

A domain partition portion such as the second slit 85 may be formed on each side of the first slit 83 in which the control electrode 84 is formed. The domain partition portion and the first slit 83 modify an electric field generated by the first and second subpixel electrodes 82a and 82b and a common electrode 91 and form different electric fields in a plurality of regions, thereby controlling a direction in which the liquid crystal molecules are arranged.

Referring to FIG. 16, a pixel of the LCD includes thin film transistors Q1 and Q2, first and second storage capacitors $C_{st1}$ and $C_{st2}$, a coupling capacitor $C_{cp}$, a control capacitor $C_{DCE}$, and first and second liquid crystal capacitors $C_{LC1}$ and $C_{LC2}$.

The first and second liquid crystal capacitors $C_{LC1}$ and $C_{LC2}$ include the common electrode 91 and the first and second subpixel electrodes 82a and 82b, respectively. The first subpixel electrode 82a and the common electrode 91, which have a liquid crystal layer interposed therebetween as a dielectric, are the terminals of the first liquid crystal capacitor $C_{LC1}$. In addition, the second subpixel electrode 82b and the common electrode 91, which have a liquid crystal layer interposed therebetween as a dielectric, are the terminals of the second liquid crystal capacitor $C_{LC2}$. The control electrode 84 and the common electrode 91, which have a liquid crystal layer interposed therebetween as a dielectric, are the terminals of the control capacitor $C_{DCE}$.

The first storage capacitor $C_{st1}$ is formed by a storage electrode 27 and the first subpixel electrode 82a overlapping the storage electrode 27. The first subpixel electrode 82a and the storage electrode 27, which have a passivation layer 70 interposed therebetween as a dielectric, are the terminals of the first storage capacitor $C_{st1}$. In addition, the second storage capacitor $C_{st2}$ is formed by the storage electrode 27 and the control electrode 84 overlapping the storage electrode 27. The control electrode 84 and the storage electrode 27, which have the passivation layer 70 interposed therebetween as a dielectric, are the terminals of the second storage capacitor $C_{st2}$.

The coupling capacitor Ccp is formed by the first subpixel electrode 82a and the coupling electrode 68. The first subpixel electrode 82a and the coupling electrode 68, which have the passivation layer 70 interposed therebetween as a dielectric, are the terminals of the coupling capacitor Ccp. The passivation layer 70 used in the coupling capacitor Ccp as a dielectric is a mere exemplary embodiment of the present invention. That is, various materials may be used.

When a data voltage is applied to the first subpixel electrode 82a and a common voltage is applied to the common electrode 91, an electric field is generated between the first subpixel electrode 82a and the common electrode 91. In addition, the data voltage is transmitted to the second liquid crystal capacitor $C_{LC2}$ via the coupling capacitor Ccp, thereby generating an electric field between the second subpixel electrode 82b and the common electrode 91.

The alignment of the liquid crystal molecules varies according to the intensity of an electric field generated between the above electrodes. In addition, since different voltages are applied to the first and second subpixel electrodes 82a and 82b, the liquid crystal molecules between the first and second subpixel electrodes 82a and 82b and the common electrode 91 tilt at different angles. That is, a data voltage directly applied to the first subpixel electrode 82a is maintained at a level higher than that of a data voltage applied to the second subpixel electrode 82b by the coupling electrode 68, which forms the coupling capacitor Ccp with the first subpixel electrode 82a. For this reason, the first and second subpixel electrodes 82a and 82b have different luminance and lateral visibility. Therefore, if the first and second liquid crystal capacitors $C_{LC1}$ and $C_{LC2}$, the coupling capacitor Ccp, and the first and second storage capacitors $C_{st1}$ and $C_{st2}$ are properly controlled, lateral visibility can be enhanced. The first and second storage capacitors $C_{st1}$ and $C_{st2}$ described above are a mere exemplary embodiment of the present invention and thus can be modified or removed when necessary.

Figure 17:
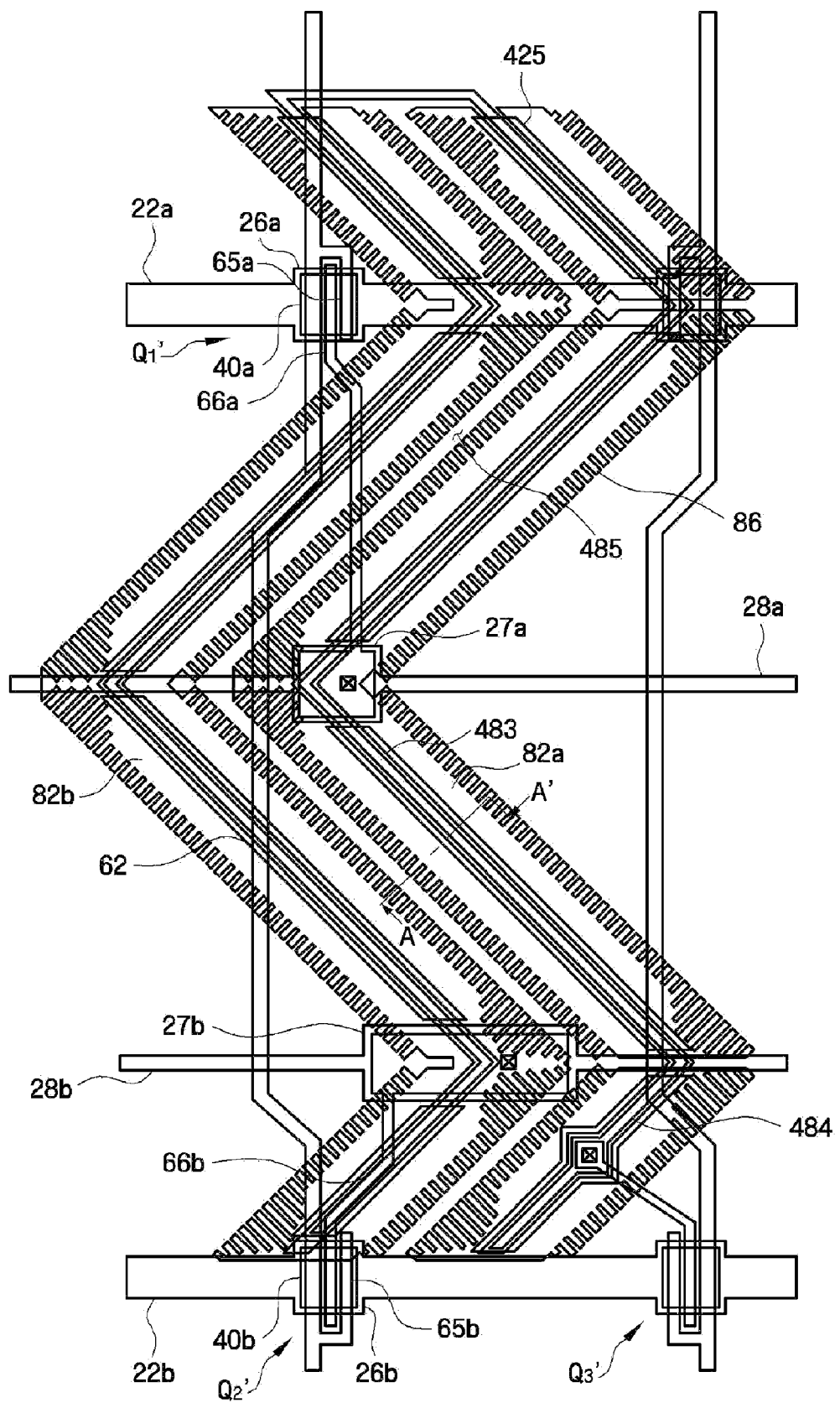
FIG. 17 is a layout view of an LCD according to a fifth exemplary embodiment of the present invention.
Figure 18:
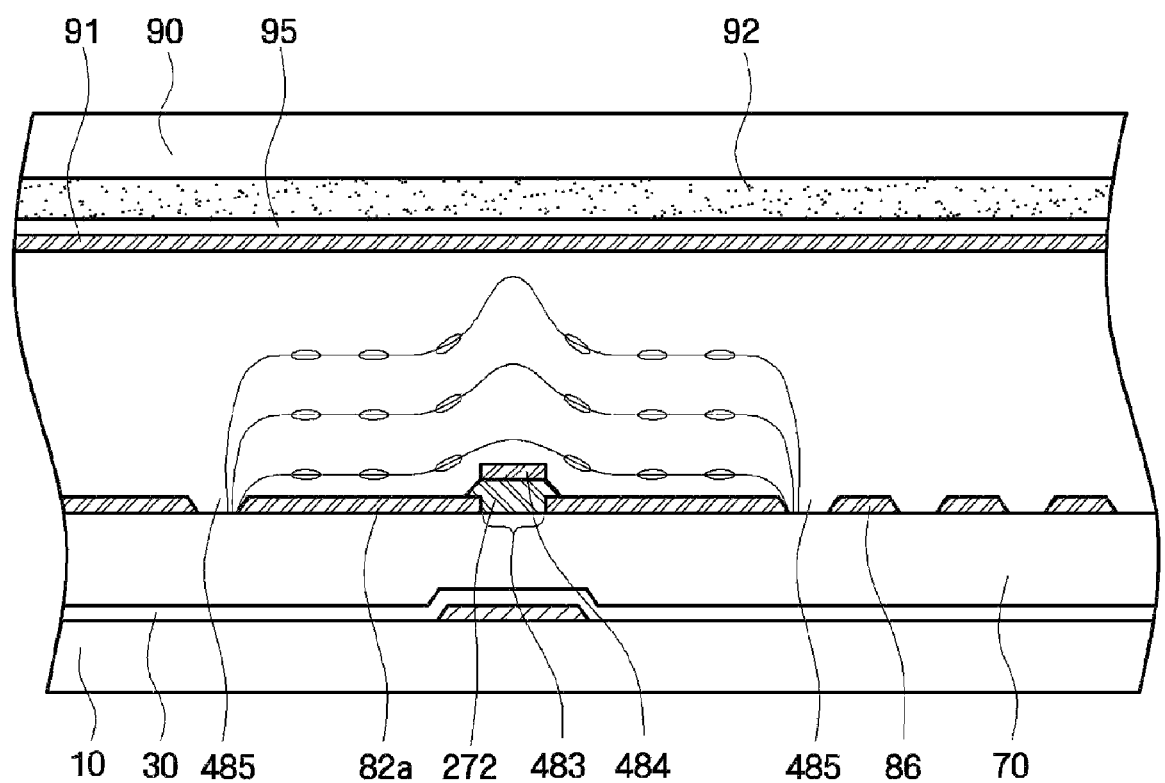
FIG. 18 is a cross-sectional view of the LCD taken along line A-A' of FIG. 17.

Hereinafter, an LCD according to a fifth exemplary embodiment of the present invention will be described with reference to FIG. 17 and FIG. 18. FIG. 17 is a layout view of an LCD according to a fifth exemplary embodiment of the present invention. FIG. 18 is a cross-sectional view of the LCD taken along line A-A' of FIG. 17.

The LCD according to the fifth exemplary embodiment of the present invention includes a control electrode 484, a first subpixel electrode 82a, a second subpixel electrode 82b, a first storage electrode 27a, a first storage line 28a, a second storage electrode 27b, a second storage line 28b, a first thin film transistor $Q_1$', a second thin film transistor $Q_2$' and the third thin film transistor $Q_3$'.

The first subpixel electrode 82a and the second subpixel electrode 82b are partitioned into a plurality of domains by a plurality of first and second slits 483 and 485, which are domain forming members.

The first slit 483 is formed as an open aperture region having a predetermined width and is formed in each of the first and second subpixel electrodes 82a and 82b. In addition, the control electrode 484, to which the control voltage is applied, overlaps the first slit 483 and is disposed in the first slit 483. A width of the first slit 483 may be 4 to 15 μm, and a width of the control electrode 484 may be 4 to 10 μm. The control electrode 484 may be narrower than the first slit 483, and thus the control electrode 484 may be formed within the first slit 483. A voltage applied to the control electrode 484 may be slightly higher than voltages applied to the first and second subpixel electrodes 82a and 82b.

In order to prevent light leakage in the vicinity of the first slit 483, a light shielding film 425 may be formed under the first slit 483. The light shielding film 425 may be wider than the first slit 483. In some cases, the light shielding film 425 may include the same material and be formed in the same process as the gate lines 22a and 22b or the first and second data lines 62a and 62b.

A pair of gray voltage sets having different gamma curves obtained from information about an image is applied to the first and second sub-pixel electrodes 82a and 82b. The gamma curve of a pixel corresponds to a combination of the gamma curves. To determine the pair of gray voltage sets to be applied to a pixel electrode, a gamma curve resulting when the gamma curves at a front side of a pixel are combined may be made similar to a reference gamma curve at the front side. In addition, a gamma curve resulting when the gamma curves at lateral sides are combined may be made similar to the reference gamma curve at the lateral side. By doing so, the lateral visibility is improved.

In addition, the control electrode 484 may be partitioned and different control voltages may be applied to the first and second subpixel electrodes 82a and 82b. That is, the control electrode 484 may apply a necessary control voltage to each of the first and second subpixel electrodes 82a and 82b according to the data voltage applied to each of the first and second subpixel electrodes 82a and 82b through a separate path. For example, relative values of the data voltages applied to the first and second subpixel electrodes 82a and 82b and a relative value of the control voltage applied to the control electrode 484 may be maintained constant. Here, the control electrode 484 may be partitioned for each of the first and second subpixel electrodes 82a and 82b, and each control voltage may be controlled using a separate switching device.

The first sub-pixel electrode 82a is driven by a first thin film transistor Q1' comprising first drain electrode 66a, first source electrode 65a and first gate electrode, which protrudes from a first gate line 22a, the second sub-pixel electrode 82b is driven by a second thin film transistor Q2' comprising second drain electrode 66b, the second source electrode 65b and the second gate electrode, which protrudes from a second gate line 22b, and the control electrode 484 formed in the first slit 483 is driven by a third film transistor Q3'.

The first sub-pixel electrode 82a is V-shaped. The second sub-pixel electrode 82b disposed at either side of the first sub-pixel electrode 82a has substantially a three-cornered zigzag shape. Serrated micro-patterns 84 are formed at edges of the first and second sub-pixel electrodes 82a and 82b. The serrated micro-patterns 86 strengthen a lateral electric field to thus facilitate movement of the liquid crystal molecules of the liquid crystal layer. The micro-patterns 84 comprise a plurality of protrusions extending perpendicularly from the sides of the first and second sub-pixel electrodes 82a and 82b. Accordingly, the plurality of protrusions constituting the micro-patterns 84 form an angle of approximately 45 degrees or −45 degrees with respect to the first or second gate line 22a, 22b.

As described above, an LCD and a method of fabricating the same according to exemplary embodiments of the present invention can control texture and leakage of light by applying a relatively low control voltage to a control electrode.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD), comprising:
an insulating substrate;
a gate line disposed on the insulating substrate;
a data line insulated from the gate line and crossing the gate line;
a thin film transistor connected to the gate line and the data line;
a passivation layer disposed on the thin film transistor;
a pixel electrode connected to the thin film transistor and partitioned into a plurality of domains by a plurality of first slits;
a control electrode disposed on the passivation layer and at least partially overlapping each first slit;
a plurality of domain forming members arranged parallel to the first slits in an alternating fashion and partitioning the pixel electrode into a plurality of domains; and
a protrusion pattern interposed between the control electrode and the passivation layer,
wherein the control electrode is positioned higher than the pixel electrode by the protrusion pattern.

2. The LCD of claim 1, wherein the protrusion pattern at least partially overlaps each first slit.

3. The LCD of claim 1, wherein a height of the protrusion pattern is 0.25 to 1.15 μm.

4. The LCD of claim 1, wherein a cross-sectional area of the protrusion pattern gradually narrows.

5. The LCD of claim 2, wherein the protrusion pattern at least partially overlaps the pixel electrode.

6. The LCD of claim 1, wherein each first slit and the control electrode have substantially equal widths.

7. The LCD of claim 1, wherein a width of each first slit is 4 to 15 μm.

8. The LCD of claim 1, wherein the difference between the width of each first slit and the control electrode is 0 to 10 μm, and the control electrode overlaps a center of each first slit.

9. The LCD of claim 1, wherein a width of the control electrode is 4 to 10 μm.

10. The LCD of claim 1, wherein the control electrode is formed of indium zinc oxide (IZO) or indium tin oxide (ITO).

11. The LCD of claim 1, wherein a control voltage higher than a data voltage applied to the pixel electrode is applied to the control electrode.

12. The LCD of claim 1, wherein the domain forming members are second slits.

13. The LCD of claim 1, further comprising a light shielding film disposed under each first slit.

14. The LCD of claim 13, wherein the light shielding film comprises the same material as the gate line or the data line.

15. The LCD of claim 1, wherein the first and second sub-pixel electrodes are shaped substantially in a zigzag pattern.

16. The LCD of claim 1, further comprising serrated micropatterns formed at edges of the first and second sub-pixel electrodes.

* * * * *